US011693483B2

United States Patent
Singh et al.

(10) Patent No.: US 11,693,483 B2
(45) Date of Patent: Jul. 4, 2023

(54) METHODS AND SYSTEMS OF DISPLAY EDGE INTERACTIONS IN A GESTURE-CONTROLLED DEVICE

(71) Applicants: Gaganpreet Singh, Markham (CA); Wei Zhou, Richmond Hill (CA); Pourang Polad Irani, Winnipeg (CA); Wei Li, Markham (CA)

(72) Inventors: Gaganpreet Singh, Markham (CA); Wei Zhou, Richmond Hill (CA); Pourang Polad Irani, Winnipeg (CA); Wei Li, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/523,267

(22) Filed: Nov. 10, 2021

(65) Prior Publication Data

US 2023/0145592 A1    May 11, 2023

(51) Int. Cl.
| | |
|---|---|
| *G06F 3/01* | (2006.01) |
| *G06F 3/03* | (2006.01) |
| *H04N 21/472* | (2011.01) |
| *H04N 21/422* | (2011.01) |
| *G06V 20/40* | (2022.01) |
| *G06V 40/20* | (2022.01) |
| *G06V 40/10* | (2022.01) |

(52) U.S. Cl.
CPC ............ *G06F 3/017* (2013.01); *G06F 3/0304* (2013.01); *G06V 20/46* (2022.01); *G06V 40/107* (2022.01); *G06V 40/28* (2022.01); *H04N 21/42204* (2013.01); *H04N 21/47205* (2013.01)

(58) Field of Classification Search
CPC ....... G06F 3/017; G06F 3/0304; G06V 20/46; G06V 40/107; G06V 40/28; H04N 21/42204; H04N 21/47205
See application file for complete search history.

(56) References Cited

U.S. PATENT DOCUMENTS

2011/0193939 A1*   8/2011   Vassigh .................. G06F 3/011
                                                         348/169
2012/0320198 A1   12/2012   Yasutake
(Continued)

FOREIGN PATENT DOCUMENTS

| CN | 105046249 A | 11/2015 |
|---|---|---|
| CN | 112965602 A | 6/2021 |

OTHER PUBLICATIONS

Meghal Dani et al., Mid-air Fingertip-based Use Interaction in Mixed Reality, Oct. 1, 2018, IEEE Xplore, pp. 174-178 (Year: 2018).*

(Continued)

*Primary Examiner* — Tam T Tran

(57) ABSTRACT

Method and systems for controlling a display device, including detecting a mid-air gesture using a sensing device; mapping the detected mid-air gesture to locations of an interaction region, the interaction region including an on-screen region of the display device and an off-screen region that is located outside an edge of the on-screen region; and performing a display device control action upon detecting an edge interaction based on the mapping of the detected mid-air gesture to locations that interact with the edge of the on-screen region.

20 Claims, 24 Drawing Sheets

(56) References Cited

U.S. PATENT DOCUMENTS

| | | | |
|---|---|---|---|
| 2014/0267142 A1* | 9/2014 | MacDougall | G06F 3/005 345/174 |
| 2014/0298273 A1 | 10/2014 | Blackstone et al. | |
| 2017/0228138 A1* | 8/2017 | Paluka | G06F 3/04842 |
| 2021/0149496 A1 | 5/2021 | Sen et al. | |

OTHER PUBLICATIONS

Kadek Ananta Satriadi et al., Augmented Reality Map Navigation with Freehand Gestures, Mar. 1, 2018, IEEE Xplore, pp. 593-603 (Year: 2018).*

Gustafson, S. et al. "Imaginary interfaces: spatial interaction with empty hands and without visual feedback" In Proceedings of the 23nd annual ACM symposium on User interface software and technology (UIST '10). Association for Computing Machinery, New York, NY, USA, 3-12. DOI:https://doi.org/10.1145/1866029.1866033 2010.

Nakamura, T. et al. "Double-Crossing: A New Interaction Technique for Hand Gesture Interfaces" In Proceedings of the 8th Asia-Pacific conference on Computer-Human Interaction (APCHI '08). Springer-Verlag, Berlin, Heidelberg, 292-300. DOI:https://doi.org/10.1007/978-3-540-70585-7_33 2008.

Rateau, H. et al. "Mimetic interaction spaces: controlling distant displays in pervasive environments" In Proceedings of the 19th international conference on Intelligent User Interfaces (IUI '14). Association for Computing Machinery, New York, NY, USA, 89-94. DOI:https://doi.org/10.1145/2557500.2557545 2014.

Markussen, A. et al. "Off-Limits: Interacting Beyond the Boundaries of Large Displays" In Proceedings of the 2016 CHI Conference on Human Factors in Computing Systems (CHI '16). Association for Computing Machinery, New York, NY, USA, 5862-5873. DOI:https://doi.org/10.1145/2858036.2858083 2016.

Shizuki, B. et al. "Laser pointer interaction techniques using peripheral areas of screens" In Proceedings of the working conference on Advanced visual interfaces (AVI '06), Venezia, Italy, 95-98. DOI:https://doi.org/10.1145/1133265.1133284 2006.

Federighi, C. "iPad Pro Cursor" YouTube https://www.youtube.com/watch?v=jijhJj_rNDI&feature=emb_title, 2020.

Roth, V. et al. "Bezel swipe: conflict-free scrolling and multiple selection on mobile touch screen devices" In Proceedings of the SIGCHI Conference on Human Factors in Computing Systems (CHI '09). Association for Computing Machinery, New York, NY, USA, 1523-1526. DOI:https://doi.org/10.1145/1518701.1518933 2009.

Kubo, Y. et al. "B2B-Swipe: Swipe Gesture for Rectangular Smartwatches from a Bezel to a Bezel" In Proceedings of the 2016 CHI Conference on Human Factors in Computing Systems (CHI '16). Association for Computing Machinery, New York, NY, USA, 3852-3856. DOI:https://doi.org/10.1145/2858036.2858216 2016.

Bragdon A. et al. "Experimental analysis of touch-screen gesture designs in mobile environments" In Proceedings of the SIGCHI Conference on Human Factors in Computing Systems (CHI '11). Association for Computing Machinery, New York, NY, USA, 403-412. DOI:https://doi.org/10.1145/1978942.1979000 2011.

Serrano, M. et al. "Bezel-Tap gestures: quick activation of commands from sleep mode on tablets" In Proceedings of the SIGCHI Conference on Human Factors in Computing Systems (CHI '13). Association for Computing Machinery, New York, NY, USA, 3027-3036. DOI:https://doi.org/10.1145/2470654.2481421 2013.

* cited by examiner

METHODS AND SYSTEMS OF DISPLAY EDGE INTERACTIONS IN A GESTURE-CONTROLLED DEVICE

FIELD

This disclosure relates generally to gesture-controlled devices and more specifically to methods and systems of display edge interactions for mid-air interfaces in a gesture-controlled device.

BACKGROUND

Traditionally, a user of an electronic device has used a pointing device, such as a hand-held mouse or joystick, or a finger or stylus to interact with the electronic device. For example, moving a hand-held mouse across a physical surface and activating switches (e.g., by pressing buttons) on the mouse enables a user to interact with (e.g., control) an electronic device. Similarly, a touch of a human finger or stylus on a touch-sensitive surface of an electronic device, such as a trackpad or touchscreen display of the electronic device, and movement of the finger or stylus on the touch-sensitive surface enables a user to interact with (i.e., to control and provide data to) the electronic device.

Large display electronic devices such as smart televisions (TVs) are typically controlled by a remote controller. A remote controller supports a wide range of functionalities using physical buttons, and pressing a button is usually convenient. This is the reason why remote controllers are widely used for interacting with televisions and other complex devices. However, remote controllers have some issues associated therewith. For example, always carrying a physical controller is sometimes not possible. A physical remote controller is suitable for multi-user control. Additionally, prior knowledge of functionality is required to operate a new remote controller. Most new functionalities on remote controllers typically go unnoticed. Furthermore, the more new buttons added to a remote controller, the higher the cost and the more complex the hardware and firmware have to be.

Modern electronic devices, such a televisions, large display screen, vehicle infotainment systems, enable a user to interact with such electronic devices using gestures performed in a space in front of the electronic device. A camera of such devices (or a camera connected to such devices) captures a video of the user performing gestures in a field of view (FOV) thereof and the electronic device processes the video to recognize the gestures. Such gestures are referred to as mid-air gestures and enable a user to interact with modern electronic devices in a more efficient manner than with a pointing device (e.g. mouse) but without having to physically touch the display of the electronic device.

Hand pointing is a type of mid-air gestures and is a universally observed human gesture which is embedded deep into human nature. Using mid-air pointing for interacting with everyday devices, such as smart TVs may overcome some of the issues identified with respect to the use of remote controllers. However, currently known mid-air interactions do not deliver the same range of functionalities provided by a remote controllers.

One possible solution to enable mid-air interactions to deliver the same range of functionalities as that of a remote controller is to come up with a set of distinct mid-air gestures. Each gesture of the set of mid-air gestures would be mapped to a distinct functionality on the electronic device. However, such a high number of mid-air gestures would pose a technical challenge in terms of gesture recognition techniques which need to uniquely identify each gesture. Another challenge is that it would be both mentally and physically demanding for a novice user to learn and perform a large number of distinct gestures.

Another possible solution to expand the range of functionalities provided by mid-air interactions is the use of on-screen buttons, contextual menus or side menus. However, using on-screen buttons occupies part of the visual space of the display thus obscuring content which is not always a practical approach. Menus are somewhat inefficient and difficult to control using mid-air interactions. Menus require an activation gesture, precise pointing, accurate selection, and functionality is limited to a number of menu items in the menu.

There is a need to provide a device and method for enhancing mid-air interactions to control display devices.

SUMMARY

The present disclosure relates to mid-air edge interactions for gesture-controlled display devices, such as smart TVs. A framework is described, which allows performing a variety of functions on a gesture-controlled device having a display, by using a limited set of gestures and mid-air pointing. The framework eliminates the need of deploying a set of exclusive hand gestures and also encourages the optimal use of visual space. Specifically, the present disclosure focuses on using the edges of a display of a gesture-controlled device and mid-air pointing to provide new functionalities, such as navigation, scrolling and controlling user interface (UI) components.

According to an example aspect, a method for controlling a display device is disclosed. The method includes detecting a mid-air gesture using a sensing device; mapping the detected mid-air gesture to locations of an interaction region, the interaction region including an on-screen region of the display device and an off-screen region that is located outside an edge of the on-screen region; and performing a display device control action upon detecting an edge interaction based on the mapping of the detected mid-air gesture to locations that interact with the edge of the on-screen region.

The detection of edge interactions based on mid-air gestures can provide an intuitive and efficient user-system interface that can in some scenarios enable a processing system to accurately and efficiently interpret user inputs, thereby improving accuracy and efficiency of the processing system when performing tasks.

In some example aspects of the method, the sensing device comprises an image capture device, the method comprises obtaining a plurality of video image frames using the image capture device, and detecting the mid-air gesture comprises detecting the mid-air gesture in the video image frames.

In one or more of the preceding aspects, the method includes controlling a display location of a navigation indicator by the display device based on the mapping.

In one or more of the preceding aspects, detecting the edge interaction comprises detecting an edge crossing interaction when the mapping indicates that the detected mid-air gesture corresponds to a movement of the navigation indicator at least partially across the edge from the on-screen region to the off-screen region.

In one or more of the preceding aspects, the display device control action comprises executing a back function whereby a previously displayed user interface screen is re-displayed in the on-screen region.

In one or more of the preceding aspects, the display device control action comprises evoking a selectable user interface element in the on-screen region.

In one or more of the preceding aspects, the display device control action comprises evoking a plurality of selectable user interface elements in the on-screen region, the method further comprising moving a focus indicator among the selectable user interface elements based on further mapping of one or more further detected mid-air gestures to locations in the interaction region.

In one or more of the preceding aspects, the method includes detecting a pre-defined mid-air gesture indicating selection of the selectable user interface element, and performing a second display device control action corresponding to the selectable user interface element.

In one or more of the preceding aspects, detecting the mid-air gesture in the video image frames comprises detecting a first dragging hand gesture, and mapping the detected mid-air gesture comprises mapping the first dragging hand gesture to a location within the off-screen region subsequent to detecting the edge interaction, and the pre-defined mid-air gesture is mapped to locations within the off-screen region.

In one or more of the preceding aspects, the pre-defined mid-air gesture comprises at least one of: (a) a second dragging hand gesture in a direction that is different from a direction of the first dragging hand gesture; (b) a pinching gesture; or (c) a pointing gesture.

In one or more of the preceding aspects, the method includes associating a plurality of edge segments of the edge with different corresponding control actions, wherein performing the display device control action comprises performing a control action that corresponds to the edge segment that the detected edge interaction occurs in respect of.

In one or more of the preceding aspects, detecting the edge interaction comprises detecting an edge proximity interaction when the detected mid-air gesture is mapped to one or more locations within a predefined distance of the edge.

In one or more of the preceding aspects, detecting the edge interaction comprises detecting a double edge crossing when the mapping indicates that a detected mid-air gesture is mapped to locations that pass across the edge from the on-screen region to the off-screen region and then across the edge from the off-screen region to the on-screen region.

In one or more of the preceding aspects, the display device control action comprises activating a user interface parameter control function, the method further comprising adjusting a value of the parameter based on a distance from the edge that detected mid-air gestures are mapped to in the an-off screen region following activating the user interface parameter control function.

In one or more of the preceding aspects, the sensing device is an image capture device, and detecting the mid-air gesture comprises detecting a first mid-air gesture of a first hand and detecting a second mid-air gesture of a second hand in video image frames captured by the image capture device; the method comprising defining an edge location of the edge based on the detected first mid-air gesture; wherein the mapping the detected mid-air gesture comprises mapping the second mid-air gesture to locations in the interaction region based on defined edge location.

According to a further example aspect is a non-transitory computer readable medium storing executable instructions that when executed by one or more processors cause the one or more processors to perform one or more of the methods of the preceding aspects.

In a further example aspect, a system is disclosed that includes: a sensing device for sensing mid-air gestures; a display device; one or more processors in communication with the sensing device and the display device. One or more non-transitory memories store executable instructions that when executed by the one or more processors configure the system to: detect a mid-air gesture based on signals received from the sensing device; map the detected mid-air gesture to locations in an interaction region that includes an on-screen region of the display device and an-off screen region that is located outside an edge of the on-screen region; detect an edge interaction when the detected mid-air gesture is mapped to locations in the interaction region that interact with the edge of the on-screen region; and perform a display device control action corresponding to the detected edge interaction.

The methods and systems of the present disclosure overcome some of the issues presented above with respect to controlling an electronic device having a large display using physical remote controllers or complex mid-air gestures and on-screen buttons and menus. The disclosed display edge interactions do not require a dedicated hardware such as a remote controller, which eliminates problems associated with hardware failure of a remote controller, the need for battery replacement, the need for a large number of buttons and a large number of infra-red protocol signals representing the different functionalities. The edge display interactions are simple to perform and therefore simple gesture recognition techniques are used to recognize the gestures. This saves processing power and the need to utilize complex recognition algorithms as would be the case when developing a unique gesture for each functionality. Edge interactions may also overcome the problems encountered when using on-screen menus and buttons which occupy part of a display's viewing area obscuring content and requiring the use of a larger display adding to cost and power consumption. Edge interactions may also be more accurate than menus which require precision in selecting its items. Edge interactions may be more versatile than menus since menus are limited to a few number of items as opposed to the display edge which can be partitioned into a larger number of segments. Advantageously, more precise control of a higher number of functionalities on an electronic device is possible while reducing processing requirements and display size.

BRIEF DESCRIPTION OF THE DRAWINGS

Reference will now be made, by way of example, to the accompanying drawings which show example embodiments of the present disclosure, and in which.

DESCRIPTION OF EXAMPLE EMBODIMENTS

Figure 1:
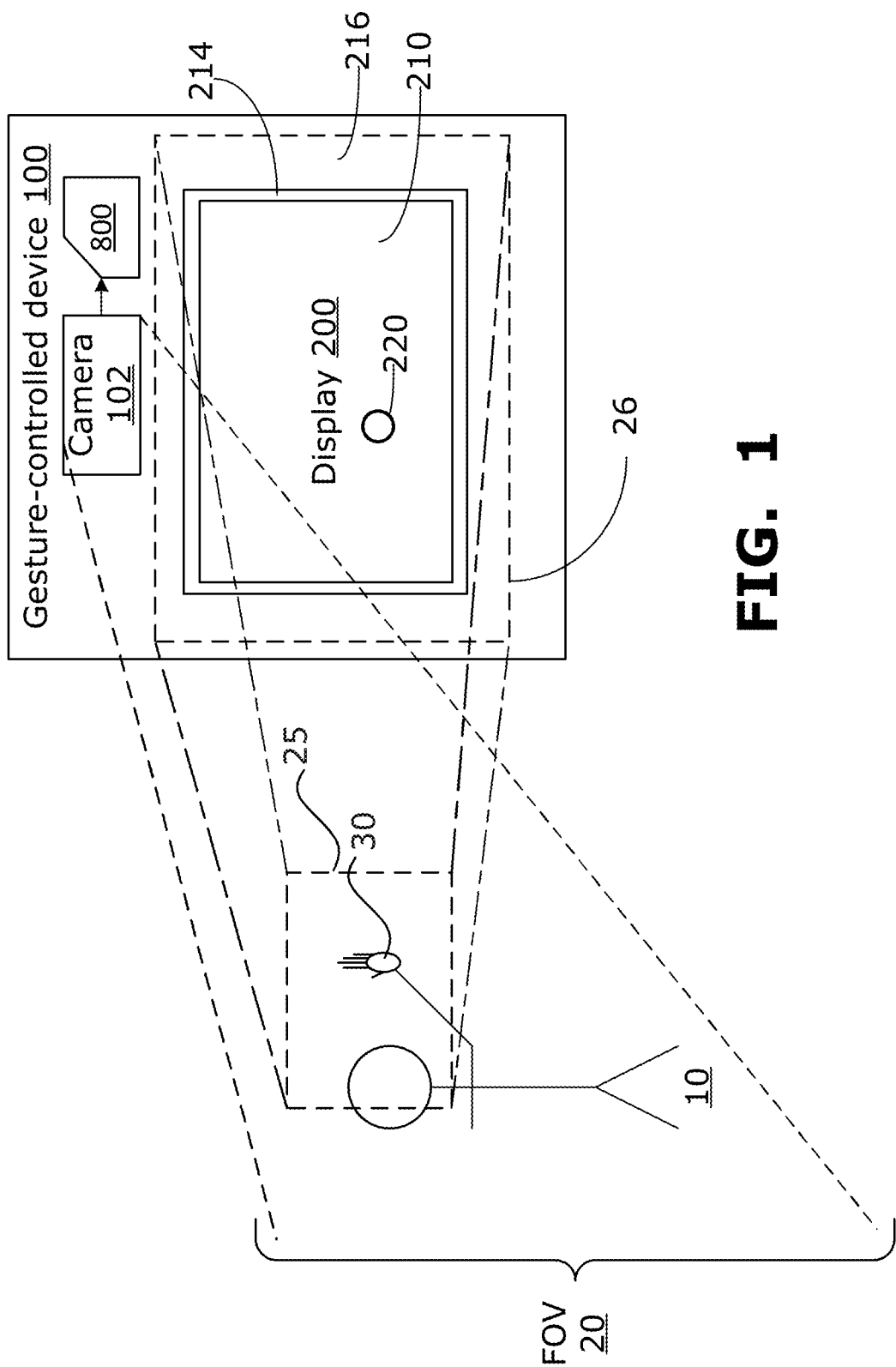
FIG. 1 is a diagram illustrating a user interacting with a gesture-controlled device.

Example embodiments are described herein that may in some applications mitigate against the current limitations of controlling a gesture-controlled device using either remote controllers or known mid-air gestures. Mid-air dragging and pointing gestures in relation to the edges of a display of a gesture-controlled device are utilized to provide new functionalities to the gesture-controlled device, such as activating shortcuts, navigation, scrolling and controlling UI components.

Gesture-control devices enable users to interact with content rendered on a display thereof using mid-air gestures. In this disclosure, a "gesture" refers to a mid-air gesture of an object. Different types of pre-defined directional gestures can be assigned different input meanings. For example, in the case where the object is a human hand and gestures are sensed by a camera, input meaning can be derived from: (i) motion of the hand through space (e.g., a motion gesture), with the direction, speed, acceleration, and path of the motion all imparting possible input attributes; (ii) configuration of the hand itself (e.g., a configuration gesture), for example, the relative positioning of the fingers and thumb of the hand, including changes in hand configuration; and (iii) combinations motion gestures and configuration gestures (e.g., motion-configuration gestures). Thus, a configuration gesture can correspond to the human hand assuming one particular configuration form a set of possible defined configurations; a motion gesture can correspond to a movement of a hand in a specified way in mid-air. Some examples of human hand mid-air gesture configurations are mentioned below and shown in the figures, and can, by way of example, a static "open pinch gesture" configuration in which the user's fingers and thumb form a C configuration with the fingers tips are spaced apart from the thumb; a static "closed pinch gesture" configuration in which the fingers tips engage the thumb; a "dynamic pinch gesture" configuration in which the fingers and thumb are moved from an open pinch gesture configuration to a closed pinch gesture configuration; and a "pointing gesture" configuration with an index finger extended and the remaining fingers and thumb curled inwards. Some examples of specified motion gestures can include for example a horizontal movement of a hand, a vertical movement of a hand, and a looping movement of a hand. In some examples, the combination of specified motion with a particular configuration can be assigned a gesture category, for example a horizontal motion gesture with an open pinch gesture configuration can be classified as a "horizontal dragging movement" gesture. In some examples, a sweeping motion gesture that is agnostic to a hand configuration may be classified as a "swipe" gesture. In the present disclosure, the terms "mid-air gesture", and "gesture" shall be used interchangeably to refer to a gesture performed by an object such as a user's hand, where the gesture can be captured by a sensing device (for example, an image capture device such as a video camera), as described in further detail below. Example embodiments will be explained in the context of a human hand. However, in some examples, the object that is used to perform a mid-air gesture in the field of view of a camera could be something other than a human hand, for example a pointing device or other object that may be manipulated by a human user, including for example device that incorporates an initial momentum unit (IMU).

With reference to FIG. 1, an example of a user 10 interacting with a gesture-controlled device 100 is shown. In this simplified diagram, the gesture-controlled device 100 includes an image-capturing device in the form of a digital image capture device (camera 102) that captures a plurality of video frames (images) within a field-of-view (FOV) 20 of the digital camera 102. The FOV 20 may include at least a portion of the user 10, in particular a face and a hand of the user 10, performing a mid-air hand gesture as discussed further below. Notably, the FOV 20 in real-life use (e.g., outside of a laboratory setting) typically includes more than just the user 10. For example, the FOV 20 may also include other objects, a background scene, or possible other humans. According to example embodiments, the gesture-controlled device 100 is configured to recognize a working space 25 within the FOV 20 of the digital camera 102. The gesture-controlled device 100 may execute instructions, which direct the digital camera 102 to capture video frames 800 of the user's hand 30 relative to the working space 25 in order to detect and process mid-air hand gestures, as will be described below. For example, the digital camera 102 may be controlled to turn towards the user's hand 30 and zoom in on the user's hand 30. In some examples, the gesture-controlled device 100 may crop captured video frames 800 to provide captured video frames 800 of the user's hand 30. The gesture-controlled device 100 may, instead of or in addition to the digital camera 102, include another sensor capable of sensing mid-air hand gestures performed by the user 10, for example, any image-capturing device/sensor (e.g., an infrared image sensor). Additionally, the gesture-controlled device 100 includes a combination of hardware and software components, which process the captured video frames to recognize different mid-air hand gestures performed by the user 10. The gesture-controlled device 100 also includes a display device 200 (hereinafter referred to as display 200) for displaying visual information thereon. A more detailed block diagram showing the components of the gesture-controlled device 100 is described below with reference to FIG. 2.

Figure 2:
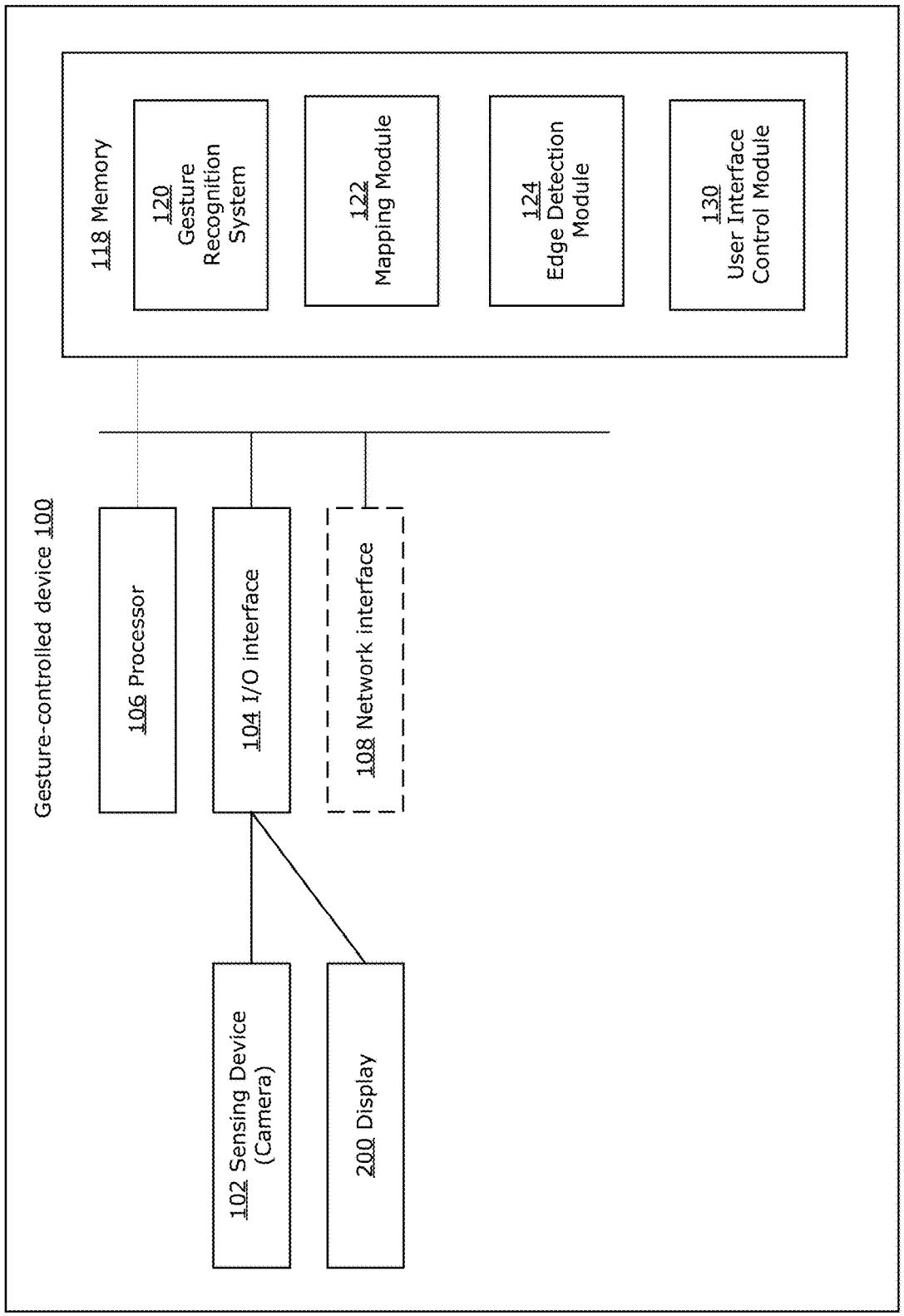
FIG. 2 is a block diagram illustrating some components of an example of the gesture-controlled device of FIG. 1.

Referring to FIG. 2, a block diagram of the gesture-controlled device 100 is shown. Although an example embodiment of the gesture-controlled device 100 is shown and discussed below, other embodiments may be used to implement examples disclosed herein, which may include components different from those shown. Although FIG. 2 shows a single instance of each component of the gesture-controlled device 100, there may be multiple instances of each component shown.

The gesture-controlled device 100 includes one or more processors 106, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The gesture-controlled device 100 also includes one or more input/output (I/O) interfaces 104, which interfaces input devices such as the digital camera 102 and output devices such as the display 200. The gesture-controlled device 100 may include other input devices (e.g., buttons, microphone, touchscreen, keyboard, etc.) and other output devices (e.g., speaker, vibration unit, etc.). The digital camera 102 (or other input device) may have capabilities for capturing live gesture input as a sequence of video frames. In some examples, digital camera 102 may include on-board processing capabilities that enable pre-processing of captured image frame data. The captured video image frames may be buffered by the I/O interface(s) 104 and provided to the processor(s) 106 to be processed in real-time or near real-time (e.g., within 100 ms).

The gesture-controlled device 100 may include one or more optional network interfaces 108 for wired or wireless communication with a network (e.g., an intranet, the Internet, a peer-to-peer (P2P) network, a wide area network (WAN) and/or a local area network (LAN)) or other node. The network interface(s) 108 may include wired links (e.g., Ethernet cable) and/or wireless links (e.g., one or more antennas) for intra-network and/or inter-network communications.

The gesture-controlled device 100 includes one or more memories 118, which may include a volatile or non-volatile memory (e.g., a flash memory, a random access memory (RAM), and/or a read-only memory (ROM)). The non-transitory memory(ies) 118 may store instructions for execution by the processor(s) 106, such as to carry out examples described in the present disclosure. The memory(ies) 118 may store, in a non-volatile format, other non-volatile software instructions, such as for implementing an operating system and other applications/functions. The software instructions may for example include instructions that when executed by the one or more processor(s) 106, configure the gesture-controlled device 100 to implement one or more of the following software-enabled modules: gesture recognition system 120, curser mapping module 122, edge detection module 124 and user interface (UI) control module 130.

Gesture recognition system 120 is configured to receive the image frames of a video captured by the digital camera 102 as input and process that input to generate gesture data that identifies a gesture type and the coordinates of the gesture within the working space 25. In this regard, gesture recognition system 120 processes the obtained video image frames using image processing and recognition methods to detect and classify a plurality of pre-defined types of mid-air hand gestures within the image frames and output data that identifies the gesture type and location of the gesture within a of reference coordinates. For example, the gesture recognition system 120 may include a trained machine-learning (ML) model, such as an object detection and classification ML model, which receives image frames of a video captured by the digital camera 102 and processes the image frames of the video to recognize the occurrence of, and types of, mid-air hand gestures within working space 25. The machine-learning model is trained using a training dataset, a supervised learning algorithm, and a loss function to learn parameters of the machine-learning model. The training dataset includes a plurality of labeled training samples where each labeled training sample is an input-output pair that includes a frame (i.e. digital video) that contains a mid-air hand gesture performed by a user and a ground truth label identifying a type of mid-air hand gesture performed by the user. Coordinates of the gesture within in the image frame samples can also be determined and provided. In some embodiments, the machine-learning model may be a trained neural network model, such as a trained convolutional neural network (CNN) model that is configured with a set of learned parameters (e.g., weights and biases) learned during training of the CNN model.

Figure 3:
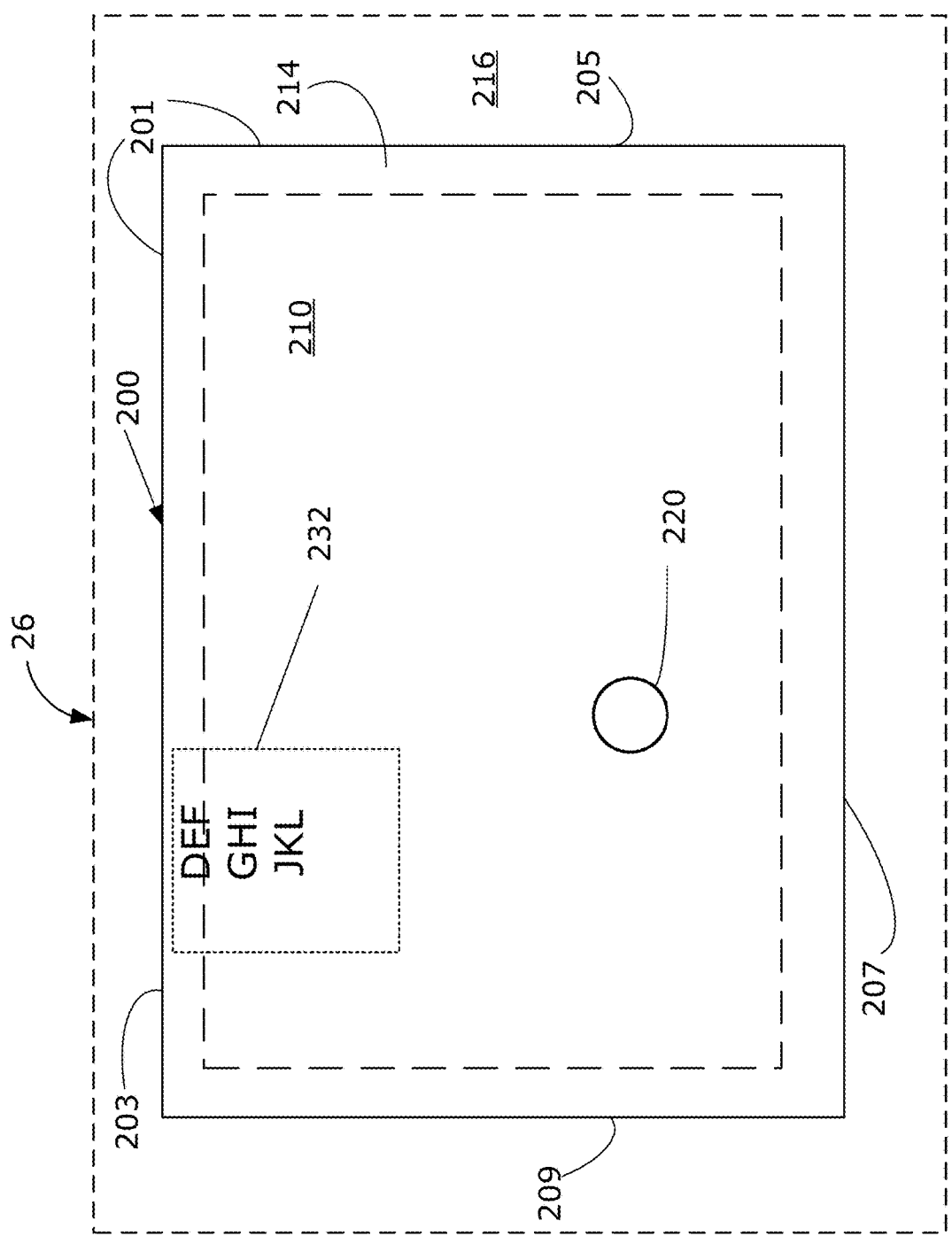
FIG. 3 is a diagram showing mapping of a user working space to a display and surrounding off-screen region.

The mapping module 122 is configured to map detected hand gestures to locations within an interaction region 26 that includes an on-screen region 210 of the display 200 and an off-screen region 216 that surrounds the on-screen region 210, as shown in FIG. 3. Mapping module 122 generates cursor location data that indicates real-time coordinates for the cursor 220 within the interaction region 26 in response to the gesture data. Mapping module 122 causes the cursor 220 to be evoked on display 200 when it is located within on-screen region 210. As used here, "evoke" in the context of a display can refer to causing a visual element to be displayed on a display.

The edge detection module 124 is configured to detect, based on the cursor location data, when the cursor 220 interacts with edge 201 of the display 210. In this regard, edge detection module 124 can be configured to generate edge interaction data that indicates one or more a type and location of an edge interaction, and an action that should be taken based on the type and location of the edge interaction and a current UI state.

UI control module 130 can be coupled to one or more of the gesture recognition system 120, the mapping module 122 and the edge detection module 124 to receive gesture data, cursor location data, and edge interaction data, respectively, and to perform display device control actions based on such data.

While in the example shown in FIG. 2, the gesture recognition system 120, the mapping module 122, the edge detection module 124 and the UI control module 130 are shown as separate components, in other examples they may be integrated together in a single module.

In some examples, gesture-controlled device 100 may be a smart TV. In some examples, a distributed system may include multiple gesture-controlled devices 100 and additional components. The distributed system may include multiple gesture-controlled devices 100 in communication with one another over a network.

In some embodiments, the gesture-controlled device 100 is part of an augmented reality system that comprises multiple digital cameras 102 (e.g. a digital camera array positioned around a physical space) and a single head-mounted display 200. In this embodiment, the single gesture-controlled device 100 is configured to process frames of a video captured by the multiple digital cameras 102 to recognize mid-air hand gestures performed by a user of the gesture-controlled device 100. The gesture-controlled device 100 discretely controls (e.g. moves) a draggable UI navigation indicator or element displayed by the head mounted display based on the recognized mid-air hand gestures as described in further detail below. It will be appreciated that these distributed systems are provided as examples, and that other distributed systems are possible.

It will be appreciated that different embodiments may include different combinations of input and output devices in place of, or in addition to, the digital camera 102 and display 200. Feedback information may be provided to the user of such a VR or AR system by displaying movement of the draggable UI control element using the head-mounted display.

In some embodiments, a distributed system may be a VR or AR system that includes multiple digital cameras 102 that capture videos containing frames (i.e. digital images) of different users performing mid-air hand gestures. For example, a VR or AR system may include a separate digital camera mounted on each user's headset or other VR or AR device, with each user's respective digital camera used to capture video containing frames of the respective user performing mid-air hand gestures. The VR or AR system with multiple users located remotely from one another could use digital cameras local to each user to capture that user's body and environment in order to capture a video of that user performing a mid-air hand gestures. In such an example multi-camera embodiment, the methods and systems described herein could be used to detect, track, and recognize each user's mid-air hand gestures by combining the frames captured by each digital camera. This plurality of frames received from multiple digital cameras could be combined temporally in some embodiments (e.g. processing each frame for gesture recognition sequentially), spatially in some embodiments (e.g. creating a composite video frame encompassing the current frame from each digital camera, and processing the composite frame for gesture recognition), or by some other method of combining frames from multiple digital cameras.

While FIG. 2 shows components of a gesture-controlled device 100 which includes a display 200, for simplicity, most figures of the present disclosure will only show the display 200, and other components of the gesture-controlled device 100 will not be shown. However, a skilled person would understand that capturing and recognizing mid-air gestures implies the presence of an image sensing device, such as camera 102, and software modules such as the modules that form gesture recognition system 120. Additionally, the skilled person would understand that to control UI components on the display 200, other components such as the UI control module 130 would also be present even if not shown in figures which only show the display 200. It would also be understood that the invention is not limited to a display device 200, such as a large screen TV, and may apply to any gesture-controlled device 100 including a display 200.

Referring again to FIG. 1, in some embodiments, the user 10 is looking at or facing display 200. A mid-air region in front of the user 10 within the FOV 20 of camera 102 corresponds to the working space 25. The working space 25 is a virtual user input space in front of the user 10, and is mapped by the gesture-controlled device 100 to an interaction region 26 that includes an on-screen region 210 of the display 200 as well as an off-screen area 216 that surrounds the on-screen region 210. In example embodiments, gesture controlled device 100 is configured to control the location, movement and functionality of a cursor 220 displayed on the on-screen region 210 in response to mid-air hand gestures that occur within the input space 25. With reference to FIG. 1, a user 10 is shown interacting with a display 200 (of a gesture-controlled device 100). The user 10 is utilizing mid-air pointing using a hand 30 and a cursor 220 shown on the on-screen region 210 moves in response to the user moving the hand 30, as will be described in more details below.

In order to assist with understanding the methods described, a few explanations are provided below, with reference to FIG. 3 which illustrates mapping of working space 25 and interaction region 26 relative to the on-screen region 210 of display 200 and the surrounding off-screen region 216. In the illustrated example, an outer periphery of the onscreen-region 210 of display 200 is defined by a rectangular border edge 201, including a top edge 203, a right edge 205, a bottom edge 207 and a left edge 209. Rectangular on-screen region 210, on which content (for example on-screen content 232) may be rendered, is bounded by and located within the rectangular border edge 201. In some examples, a border portion of the on-screen region 210 that is located adjacent the four edges (203, 205, 207, 209) of the display 200 is referred to as a border region 214.

In this disclosure, a "cursor" (e.g., cursor 220) can refer to a navigation indicator such as a pointer that is rendered on a display and controlled in response to user action such as response to a mid-air gesture made by a user's hand, mid-air manipulation of an input pointer device by the user, or an input pointer device manipulated by the user.

In this disclosure, the "on-screen region" (e.g., on-screen region 210) of a display can refer to the area of the display that is used to render viewable images.

In this disclosure, "off-screen region" (e.g., off-screen region 216) can refer to a virtually-defined region surrounding the on-screen region of the display.

In this disclosure, "edge" (e.g., edge 201) can refer to a physical edge of a display that is a boundary between the on-screen region and the off-screen region.

In this disclosure, the "border region" (e.g., border region 214) can refer to a portion of the on-screen region that borders the edge of the display.

In this disclosure, the terms "edge interaction" can refer to an interaction in which mid-air gestures are mapped to locations of the interaction region 26 that interact with the edge 201 in a predefined manner. In some examples, a navigation indicator (e.g., cursor 220) can be used to provide visual feedback of the locations that mid-air gestures are mapped to. An edge crossing interaction can refer to an edge interaction wherein a mid-air gesture is mapped to locations that at least partially cross the edge from the on-screen region to off-screen region or vice versa. An edge proximity interaction which can refer to an edge interaction wherein a mid-air gesture is mapped to locations to within a defined distance of the edge.

In this disclosure an "on-screen interaction" can refer to an interaction whereby input mid-air gestures are mapped to locations that fall within the on-screen region 210.

In this disclosure an "off-screen interaction" can refer to an interaction whereby input mid-air gestures are mapped to locations that are in the off-screen region 216 of the interaction region 26.

Example embodiments for controlling display devices using edge interactions are described below. While the methods are described using mid-air hand gestures captured by an sensor device that is an image capture device such as a camera, the described edge interaction control based-methods can also be applicable for all systems that support navigation using a user input device such as an air-mouse, a traditional mouse, or any suitable inertial measurement unit (IMU) peripheral such as a hand held virtual reality controller. Accordingly, in at least some examples, a camera is not required to track gestures, and an alternative sensor for tracking user movement to locations within the interaction region 26 could be used. For example, a handheld IMU peripheral could alternatively be used to provide information about mid-air gestures. In some examples, a handheld IMU peripheral or other sensor could be used to supplement information from a camera.

Figure 4A:
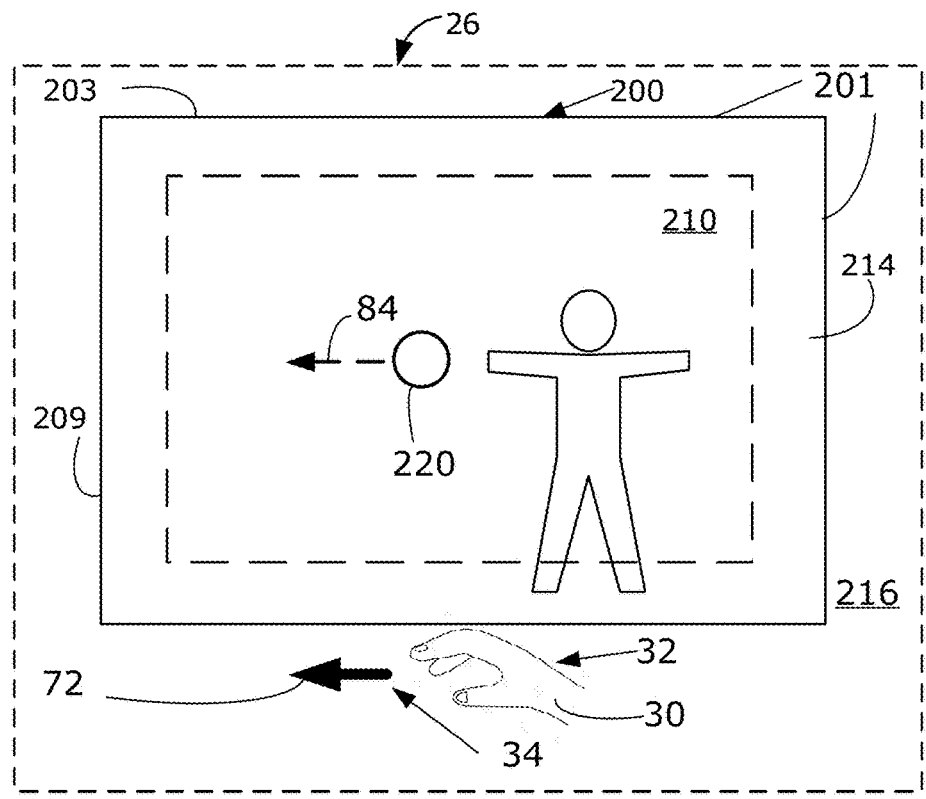
FIG. 4A depicts moving a cursor on a display towards an edge thereof using a dynamic dragging hand gesture.
Figure 4B:
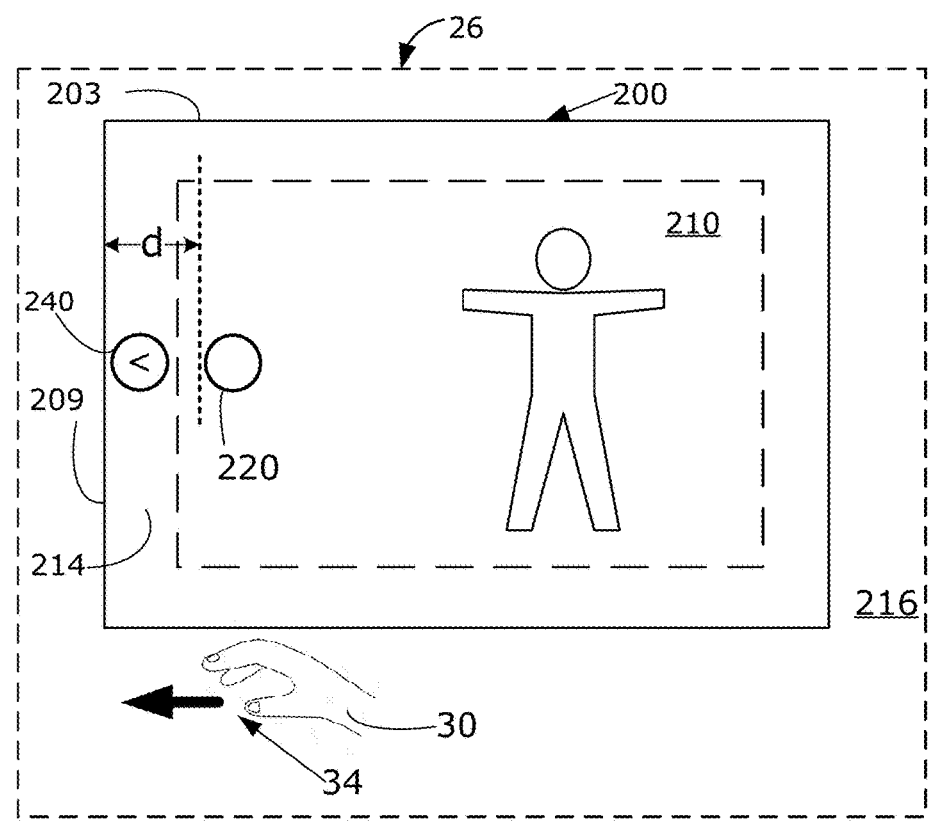
FIG. 4B depicts displaying a back button on the display of FIG. 4A in when the cursor is within a distance from the edge.

An example embodiment of controlling a display 200 using edge interactions is first described with reference to FIGS. 4A and 4B. In this embodiment, it is desired to perform a display device control action that corresponds to a "back" function, such as implemented in a web browser, or in an application. For example, the rendered on-screen content may be a movie playback, and the user may wish to go back to the list of movies to select another movie. Similarly, in the case of a browsing scenario, the rendered on-screen content may be a web page and the user may wish to go back to a previous web page. In prior user interface structures, a "back" button may be displayed, but as discussed above, permanently displaying a button on the display 200 would occupy part of the on-screen region 210 and may require a degree of pointing accuracy to activate. In the depicted embodiment, the hand 30 is configured in an open pinch hand configuration 32, positioned in working space 25. The hand 30 is then dragged in a horizontal dynamic dragging gesture 34 in the left direction (as indicated by arrow 72; hereinafter directional movement indicated by arrows will be referred to as the direction followed by a reference numeral, e.g., "left 72" or "left direction 72") towards the left edge 209 of the on-screen region 210.

The gesture recognition system 120 of the gesture-controlled device 100 recognizes the horizontal dynamic dragging gesture 34. Mapping module 122 maps movement of the hand 30 during the dragging gesture 34 to respective locations within the interaction region 26, and initiates display of and then moves a cursor 220 in the same direction (left 84) as the movement of the hand 30 performing the horizontal dynamic dragging gesture 34. When the cursor 220 is within a predefined distance (distance "d") from the left edge 209, the edge detection module 124 detects an edge proximity interaction and notifies UI control module 130, causing a display device control action that results in a user interface control element such as the back button 240 to be displayed on the visual space of the display 200. In the embodiment shown in FIGS. 4A and 4B, the back button 240 is displayed in the border region 214 adjacent the left edge 209. In other embodiments, the back button 240 may be displayed in the on-screen region 210 that corresponds to that border region 214 that is adjacent the left edge 209.

Figure 4C:
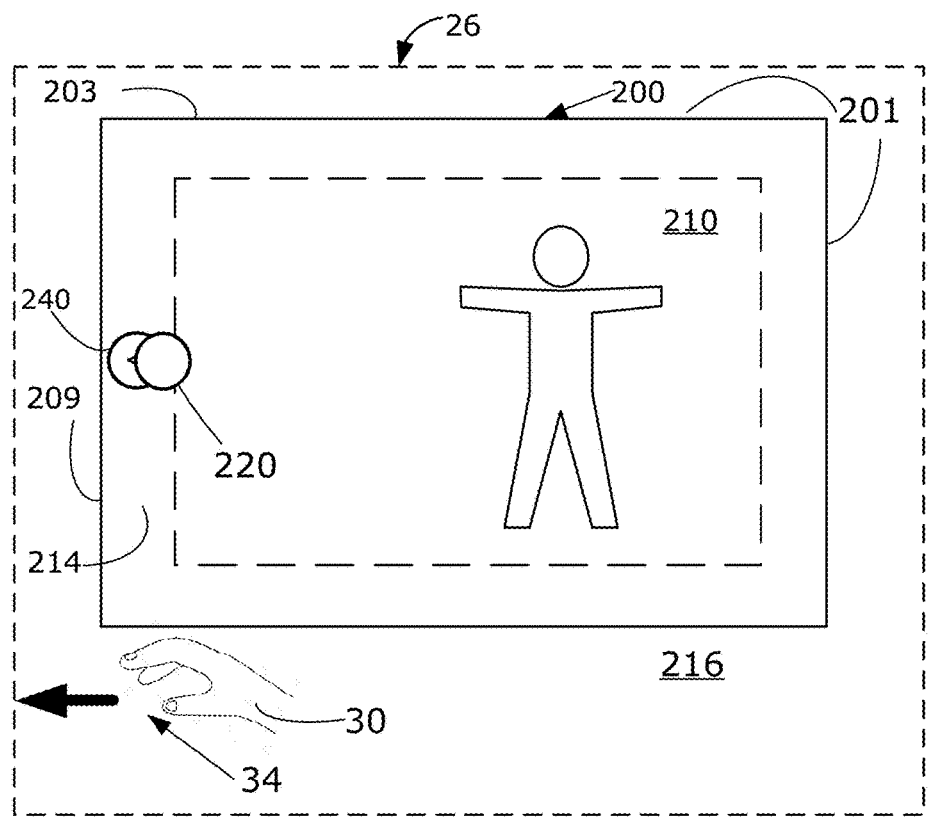
FIG. 4C depicts an activation of the back button of FIG. 4B in response to cursor crossing.

In some embodiments, if the leftward horizontal dynamic dragging gesture 34 continues further to the left, the UI control module 130 continues to move the cursor 220 further to the left as well. Edge detection module 124 determines that a further edge proximity interaction occurs when the cursor 220 crosses a boundary of the back button 240, as shown in FIG. 4C.

Figure 4D:
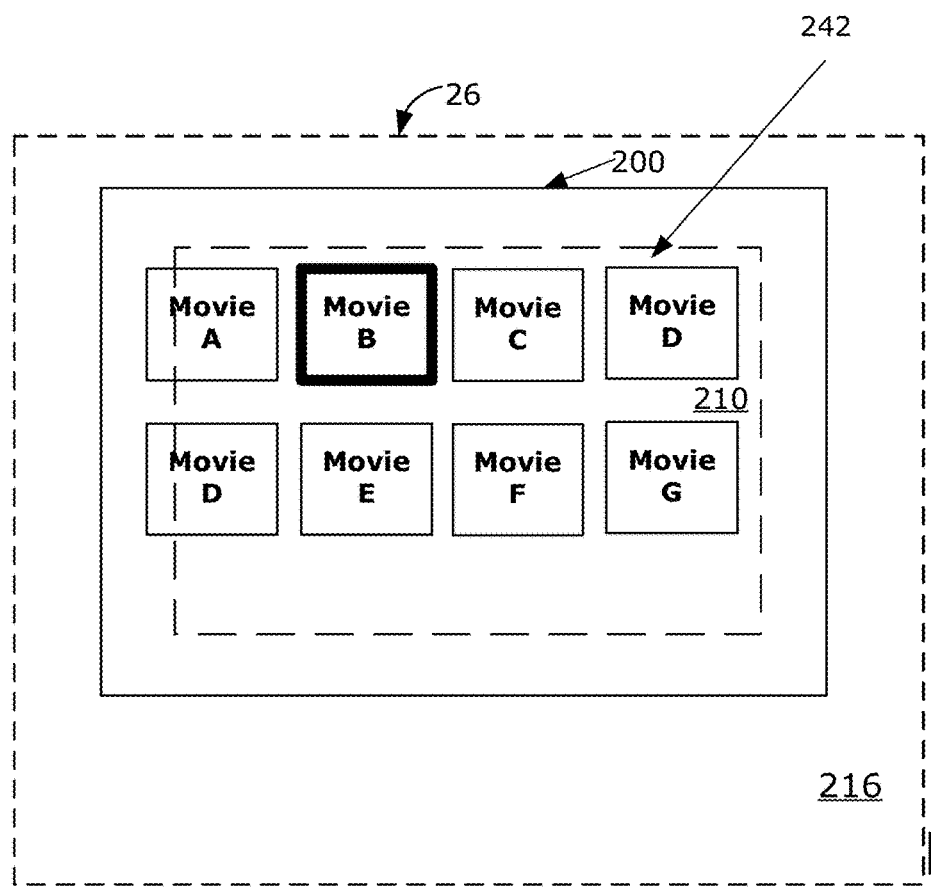
FIG. 4D depicts a movie list displayed in response to the activation of the back button of FIG. 4C.

In response to notification by edge detection module 124 that the cursor 220 has crossed a boundary of the back button 240, the UI control module 130 deems that the back button 240 has been selected or activated by user 10 (i.e., that back button 240 has been activated). Upon activation of the back button 240, an action associated with the back button 240 is carried out. For example, activating the back button 240 may cause a back function to be executed whereby video playback is terminated and a previously displayed user interface screen is re-displayed in the on-screen region, such as a list of user selectable movie options 242, as shown in FIG. 4D. Advantageously, in the example of FIGS. 4A to 4D, a single gesture (e.g., a leftward horizontal dynamic dragging gesture 34) is used to display a UI control element, such as a back button 240, and also activate the back button 240 trigging the action associated therewith. Further, the back button 240 is not always displayed and therefore does not occupy any screen space or obscure any on-screen content.

Figure 5A:
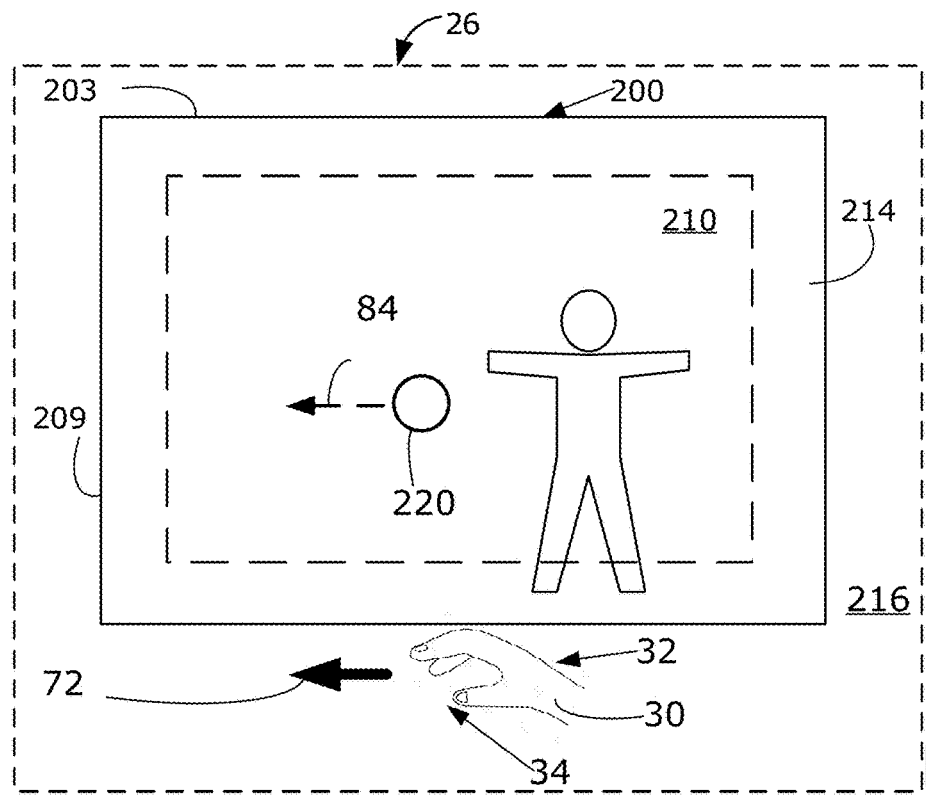
FIG. 5A depicts moving a cursor on a display towards an edge thereof using a dynamic dragging hand gesture.
Figure 5B:
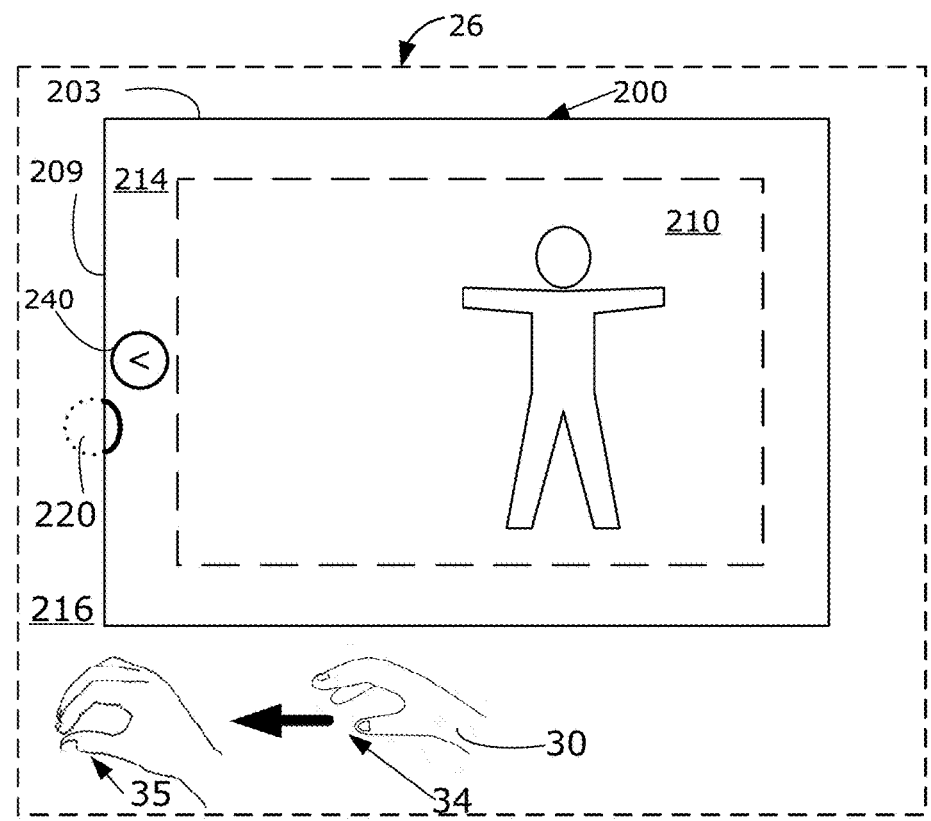
FIG. 5B depicts displaying a back button in response to a cursor moving into the off-screen region and the activation thereof using a dynamic pinching gesture.
Figure 5C:
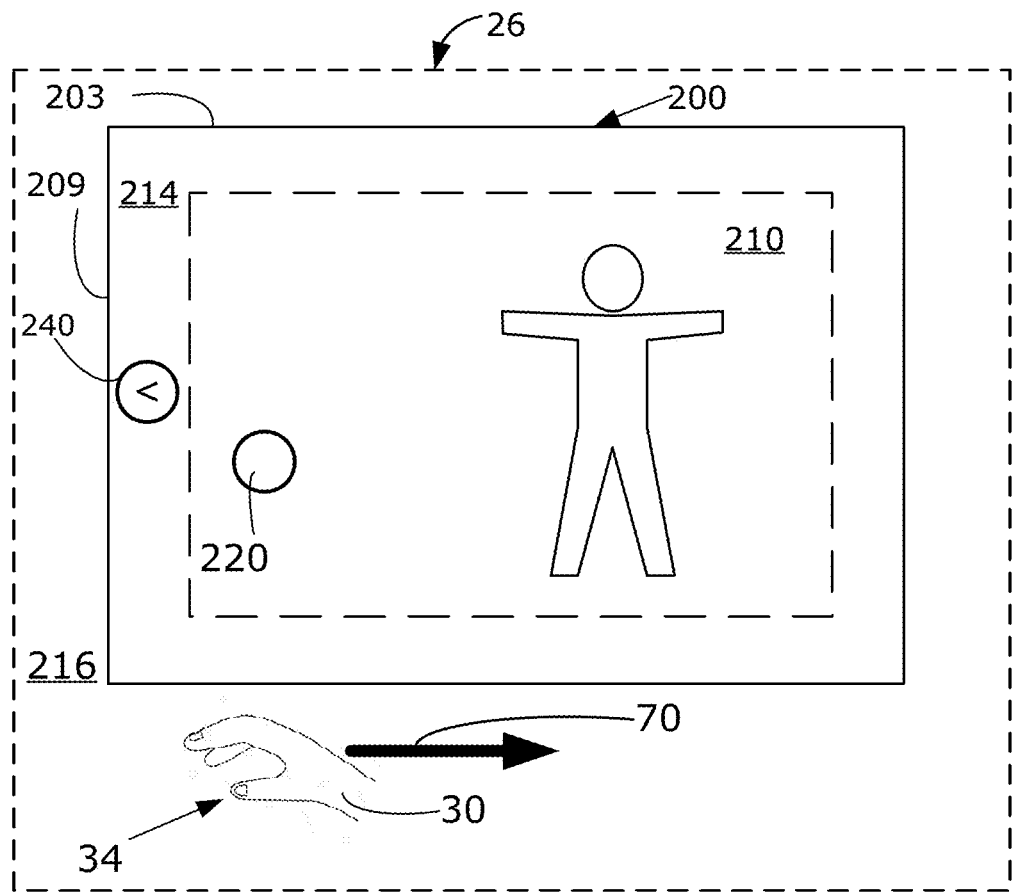
FIG. 5C depicts the activation of the back button of FIG. 5C using a dynamic dragging gesture in an opposite direction.

In another example of the present disclosure, a user interface control element is displayed in response to detecting a mid-air gesture that corresponds to moving the cursor 220 from the on-screen region 210 to the off-screen region 216 that surrounds the on-screen region 210, as illustrated in FIGS. 5A to 5C (e.g., an edge interaction that includes an edge crossing event). With reference to FIGS. 5A and 5B, a dynamic horizontal dragging mid-air gesture 34 is performed in the left direction 72, similar to FIG. 4A and is recognized by the gesture recognition system 120. The locations of the hand 30, throughout the gesture, are determined by the gesture recognition system 120 and provided to the mapping module 122. In response the mapping module 120 moves the cursor 220 in the same direction as the direction of the horizontal dragging hand gesture 34, i.e. in the left direction 72. In the depicted embodiment, the hand 30 keeps moving to the left 72 until the cursor 220 crosses the left edge 209 and extends partially into the off-screen region 216 to the left of left edge 209. The edge detection module 124 receives the location of the cursor 220 from the mapping module 122. In FIG. 5B, the off-screen portion of cursor 220 is shown in dotted lines in the off-screen region 216 for illustration only; it will be noted that an object that has been moved off the on-screen region 210 and into the off-screen region 216 is not actually visible. In response to determining that at least a pre-determined percentage or portion of the cursor 220 (for example at least half of the surface area of the cursor 220) has crossed left edge 209 and moved into the off-screen region 216, the edge detection module 124 determines that an edge crossing interaction has occurred and notifies UI control module 130 of a required action. In response, UI control module 130 implements the required action, e.g., display of a UI control element (e.g., the back button 240) and displays the UI control element. In the depicted embodiment, the back button 240 is displayed in the border region 214.

In some embodiments, the gesture controlled device 100 is configured to detect a further user mid-air gesture as indicating activation of a selectable UI control element, such as the button 240. By way of example, the user may perform a dynamic pinching hand gesture 35 as shown in FIG. 5B (e.g., hand moves from an open pinch configuration to a closed pinch configuration). The gesture recognition system 130 recognizes the dynamic pinching hand gesture 35, and notifies the UI control module 130. In response to the dynamic pinching hand gesture 35, the UI control module 130 activates the back button 240. Accordingly, the action associated with the back button 240 is carried out. For example, playback of a movie is stopped and an interface display includes a list of movies 242, such as shown in FIG. 4D, is rendered of display 200. Accordingly, recognition of a first dynamic dragging gesture 34 causes the UI control module 130 to display a UI control such as button 240 in response to the cursor 220 crossing into off-screen region 216. A second gesture, such as a dynamic pinching gesture 35 causes the UI control element (e.g., back button 220) to be activated and the action associated therewith to be performed. In the illustrated example, dynamic pinching gesture 35 is an off-screen interaction as the cursor 220 is off-screen at the time the gesture is performed. In some example, a pointing gesture (for example, a jabbing or waving hand movement with an extended index finger) may be used to indicate selection of the UI control element.

In another example, in order to activate the UI control element, such as the button 240, the user performs a second gesture which causes the cursor 220 to be moved back into on-screen region 210. For example, with reference to FIG. 5C, the user performs a dynamic dragging hand gesture 34 in the right direction 70, after the cursor 220 was moved virtually into the off-screen region 216. The gesture recognition system 120 recognizes the dynamic dragging hand gesture 34 in the right direction 70 as being opposite to the preceding direction (i.e. the left direction 72 shown in FIG. 5A) and provides the location and motion of the hand from that gesture to the mapping module 122. In response to the dynamic dragging hand gesture 34 in the right direction, the mapping module 122 moves the cursor 220 to the right and back into the on-screen region 210. As the cursor 220 moves back into on-screen region 210, the edge detection module 124 detects the edge crossing interaction by the portion of the cursor 220 that was previously virtually in the off-screen region 216 and notifies the UI module 230. In response to the edge crossing back into on-screen region 210, the UI control module 130 activates the button 240. Accordingly, the action associated with the button 240 is carried out. For example, a list of movies 242 may be displayed, as shown earlier in FIG. 4D.

Figure 6:
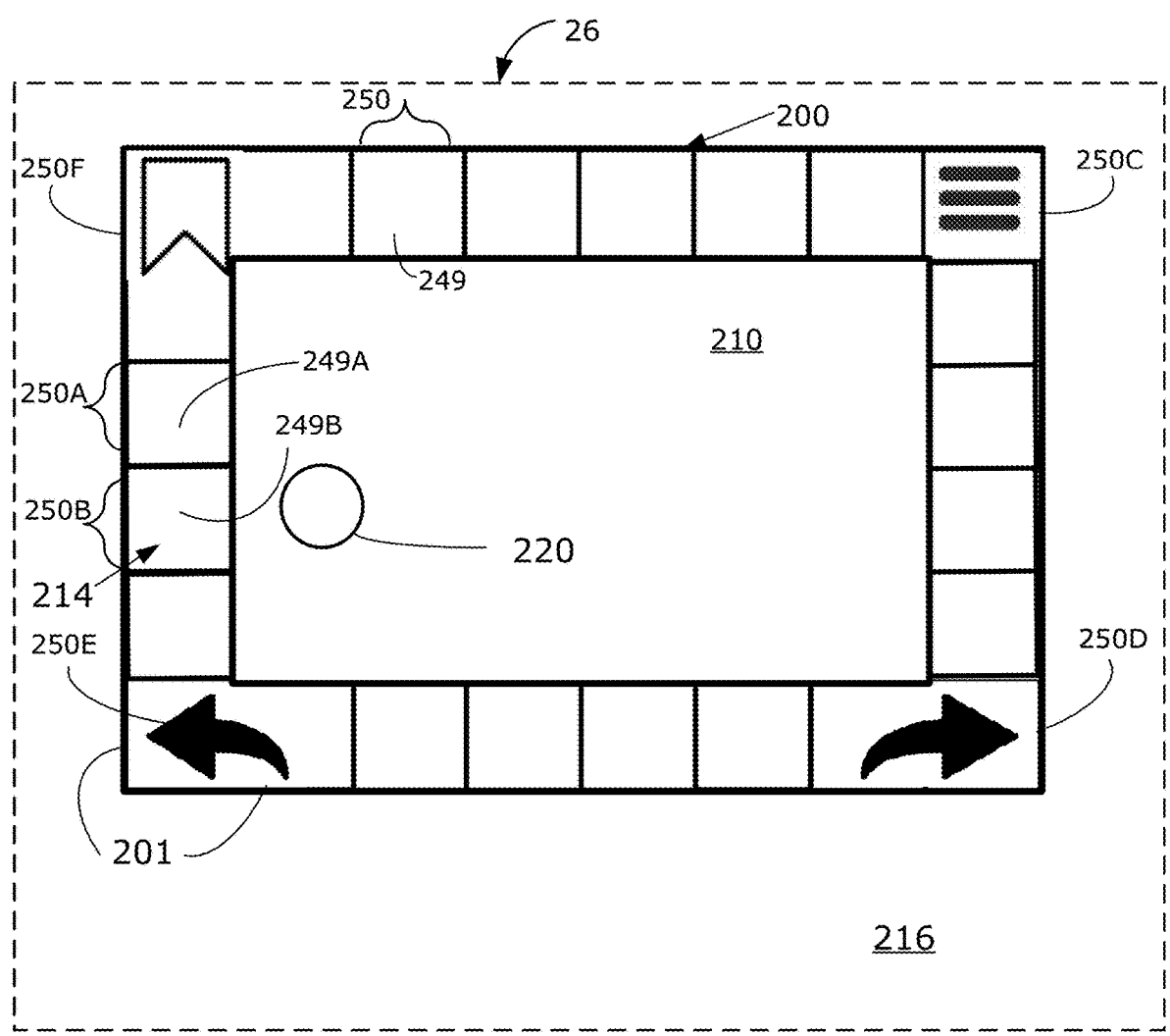
FIG. 6 depicts a display having the border region thereof divided into a plurality of border segments.

With reference to FIG. 6, in some example embodiments, the rectangular edge 201 of display 200 border region 214 may be segmented into a plurality of edge segments 250. In some examples, each edge segment 250 can by visually marked by an associated border segment 249 that is displayed in the border region 214 of on-screen region 210. By way of example, edge segment 250A is visually delineated by adjacent border segment 249A, and edge segment 250B is visually delineated by adjacent border segments 249B. Each edge segment 250 can be mapped to a respective UI function. Accordingly, when a user interface element, such as a cursor 220, is moved (for example in response to detection of a dynamic dragging mid-air hand gesture) to cross an edge segment 250 the functionality associated with (e.g., mapped to) that edge segment 250 is activated. Each edge segment 250 of the plurality of segments corresponds to a predefined UI function which is invoked or triggered in response to an edge crossing interaction with respect to the corresponding edge segment 250. In some embodiments, the interaction may comprise detection of the cursor 220 crossing the edge segment 250, in response to a mid-air dragging hand gesture as described earlier. In other embodiments, the action which invokes the functionality may be detection of a defined gesture as described earlier with reference to FIG. 5B. Some frequently used functionalities may be assigned to corner edge segments for ease of access. For example, the top right corner edge corner segment 250C is mapped to invoking a menu functionality, the bottom right edge corner edge segment 250D is mapped to forward navigation, the bottom left corner edge segment 250E is mapped to backward navigation, and the top left corner edge segment 250F is mapped to invoking a bookmark management menu. Accordingly, interacting with an edge segment 250 may invoke a command or a UI widget. As used herein, a UI widget is an element of a graphical user interface (GUI) that displays information or provides a specific way for a user to interact with an operating system or an application.

Figure 7:
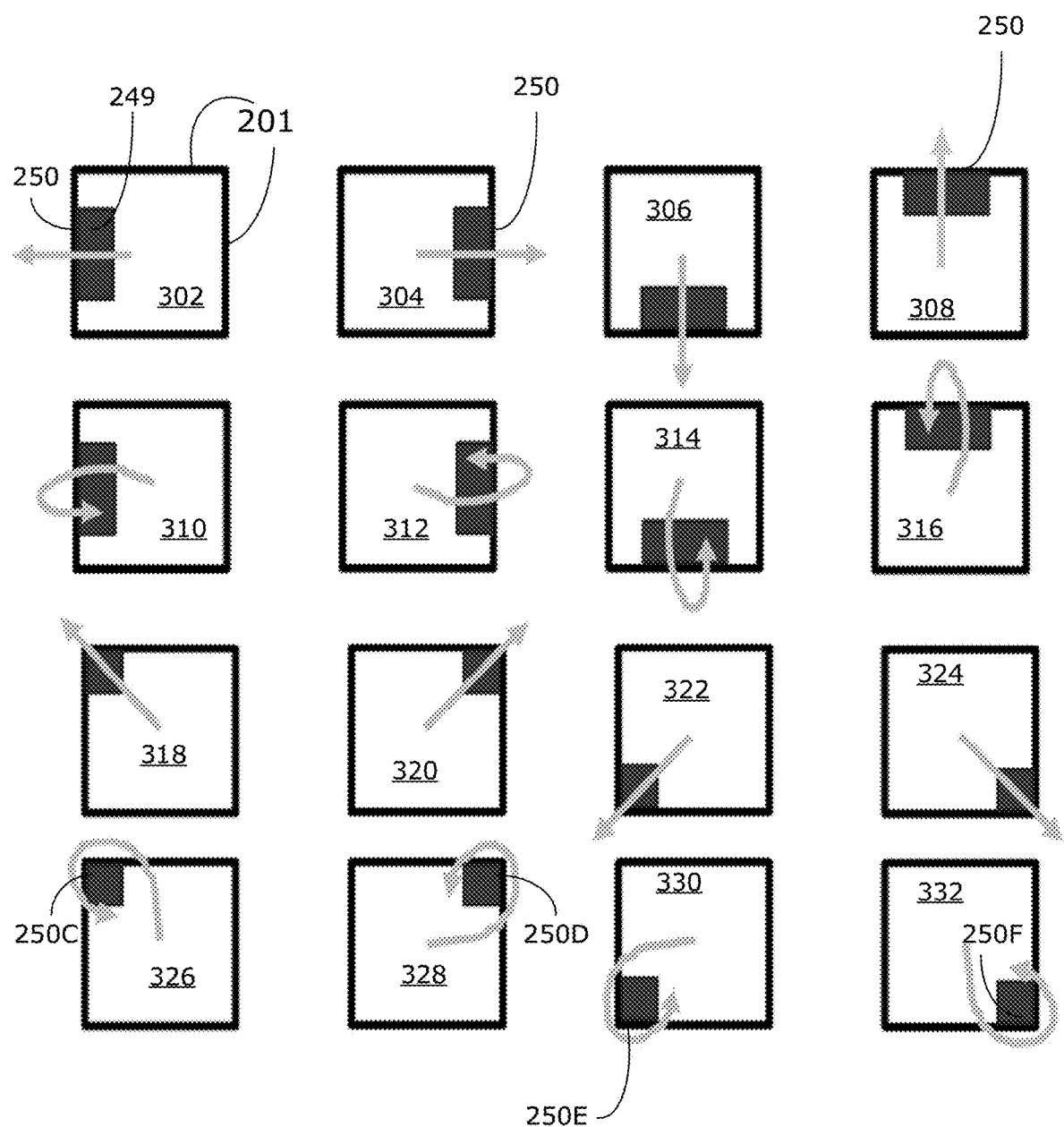
FIG. 7 is a diagram depicting a plurality different edge interaction examples.

Examples of different types of edge crossing interactions are illustrated with respect to FIG. 7. The depicted interactions correspond to user 10 mid-air gestures within user working space 25 performed in the direction of the arrow depicted in each interaction. The gestures are recognized by the gesture recognition system 120 and provided to the cursor mapping control module 122. In response, the UI control module moves a corresponding cursor 220 to track the movement of the gesture. Accordingly, in FIG. 7 the arrows shown indicate the path of the user 10 mid-air gesture and also the corresponding path of movement of the cursor 220. When the movement of the cursor 220, which tracks the movement of the gesture, causes the cursor 220 to cross an edge segment 250 of the edge 201 of on-screen region 210, the edge detection module 124 detects the edge crossing and generates an edge crossing event which triggers an action. For example, horizontal gesture single vertical edge crossing interactions are shown as interactions 302 and 304 (e.g., horizontal gesture referring to a horizontal movement, and vertical edge referring to the left and right vertical edges, respectively). Vertical gesture single horizontal edge crossing interactions are shown as interactions 306 and 308. Diagonal single corner edge crossing interactions, applied to corner edge segments, are shown as interactions 318, 320, 322 and 324. In response to all single edge crossing gestures, the cursor 220 is moved by the mapping module 122 towards a corresponding edge of the display 200 until it crosses into off-screen region 216. In response to detecting that the cursor 220 has crossed an edge segment 250, the edge detection module 124 selects the edge segment 250. The edge detection module 124 notifies the UI control module 130 that a particular segment (i.e., the edge segment 250 that the cursor 220 has interacted with) is selected. In response, the UI control module 130 may alter the appearance of the border segment 249 that is adjacent the edge segment 250 to indicate its selection (for example, in the example of FIG. 7 the border region 249 adjacent the selected edge region 250 is changed to a darker color to indicate the selection). Once an edge segment 250 has been selected by means of any of the aforementioned single crossing interactions, the corresponding functionality may be invoked by performing another mid-air hand gesture while the cursor (cursor) 220, is in the off-screen region 216. For example, a dynamic pinching mid-air hand gesture performed while the cursor 220 is in the off-screen region 216 may be detected by the gesture recognition system 120 and provided to the UI control module 130. In response, the UI control module 130 activates the action associated with the selected edge segment 250.

Horizontal gesture double crossing vertical edge interactions are shown as interactions 310 and 312. Vertical gesture double crossing horizontal edge interactions are shown as interactions 314 and 316. Vertical double crossing interactions are particularly useful for bottom border segment interactions to distinguish from the user's hand 30 dropping down without intending to activate any particular function on the gesture-controlled device 100. Looping double crossing edge interactions applied to the corner border segments 250C, 250D, 250E and 250F are shown as interactions 326, 328, 330 and 332, respectively. With double crossing gestures the gestures is recognized and tracked by the gesture recognition system 120 and the hand locations throughout the gesture are provided to the mapping module 122. Accordingly, the mapping module 122 causes the cursor 220 to move and track the recognized gesture. In response to determining that the cursor 220 has crossed from the on-screen region 212 to the off-screen region 216 over a particular edge segment 250, the edge detection module 124 selects that particular edge segment 250. In response to determining that the cursor 220 has crossed back from the off-screen region 216, over the same selected edge segment 250 and into the on-screen region 210, the edge detection module 124 activates the selected edge segment 250. In the case of a looping double crossing interactions, one or both of the outward edge crossing (i.e., from on-screen region 210 to off-screen region 216) or inward edge crossing (i.e., from off-screen region 216 to on-screen region 210) may occur at an edge segment 250 that is adjacent to a target edge segment 250. In such cases, the edge detection module 124 is configured to select the target edge segment 250 and activate a respective action according to predetermined rules. For example, in the case where an outward edge crossing and inward edge crossing both occur on different edge segments 250 that are separated by an intermediate edge segment 250, then the intermediate edge segment 250 is selected as the selected and activated segment 250; in the case where an outward edge crossing and inward edge crossing both occur on different edge segments 250 that are immediately adjacent, then the intermediate edge segment 250 that is crossed on the inward edge crossing is selected as the selected and activated segment 250.

Upon activation of the border segment 250, the action associated therewith is carried out by the gesture-controlled device 100.

In some embodiments of the present disclosure, edge interactions may invoke a UI component (also known as a "UI control" and a "UI widget"). This is explained with reference to FIGS. 8A-8E which depict a display 200 showing on-screen content in the form of an example media player application user interface.

Figure 8A:
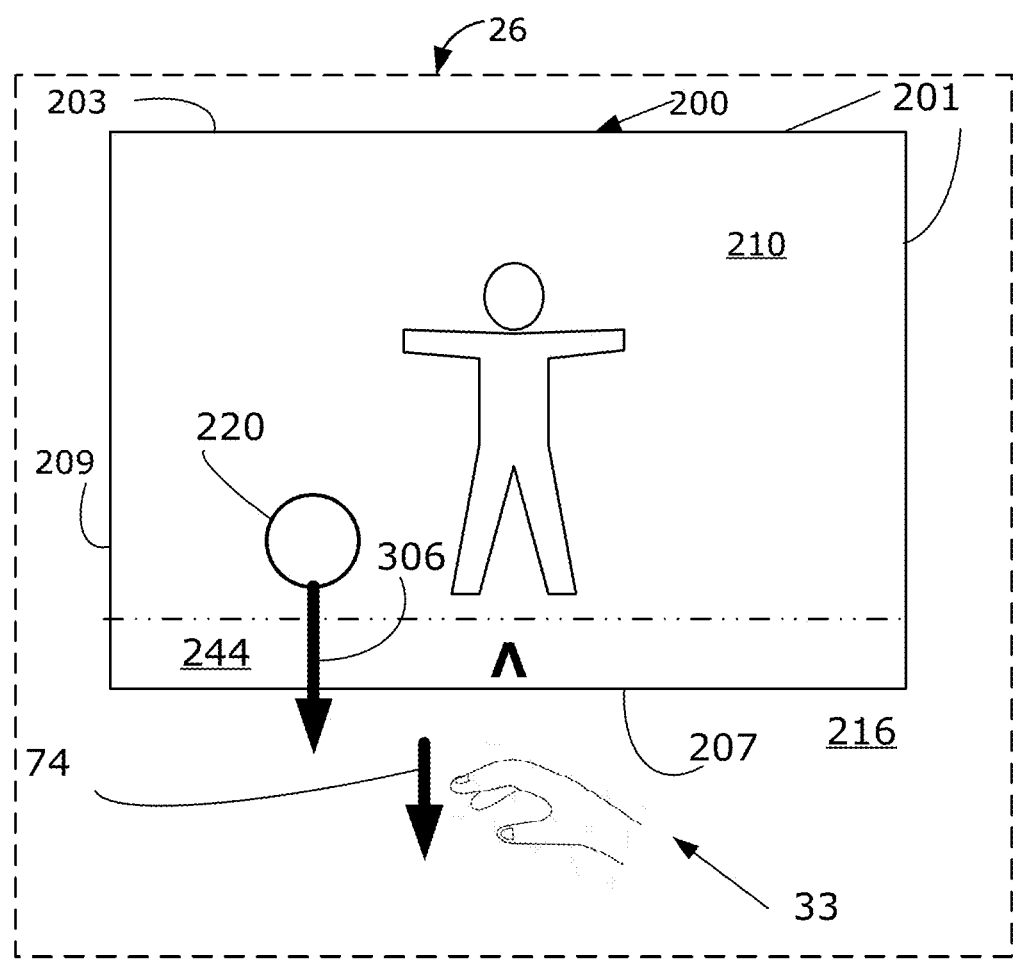
FIG. 8A depicts the activation of a bottom bar of the border region in response to vertical downward single-crossing gesture.

In FIG. 8A, a downward single-edge crossing interaction 306 with bottom edge 207 is used to activate a bottom bar 244. In particular, a user 10 performs a dynamic vertical dragging gesture 33 in the downward direction 74. The dynamic vertical dragging gesture 33 is recognized by the gesture recognition system 120 and provided to the mapping module 122, which moves the cursor 220 in the downward direction as well. The cursor 220 crosses from the on-screen region 210 across the bottom edge 207 and into the off-screen region 216. In response to the cursor 220 crossing the bottom edge 207 into the off-screen region 216, the edge detection module 124 detects the edge crossing and determines a required action associated with the detected edge crossing interaction 306. In the depicted embodiment, the action associated with the edge crossing interaction 306 includes activating a UI widget that includes a bottom bar 244. The edge detection module 124 indicates that action to the UI control module 130. In response, the UI control module 130 displays the bottom bar 244 along the bottom part of the border region 214.

Figure 8B:
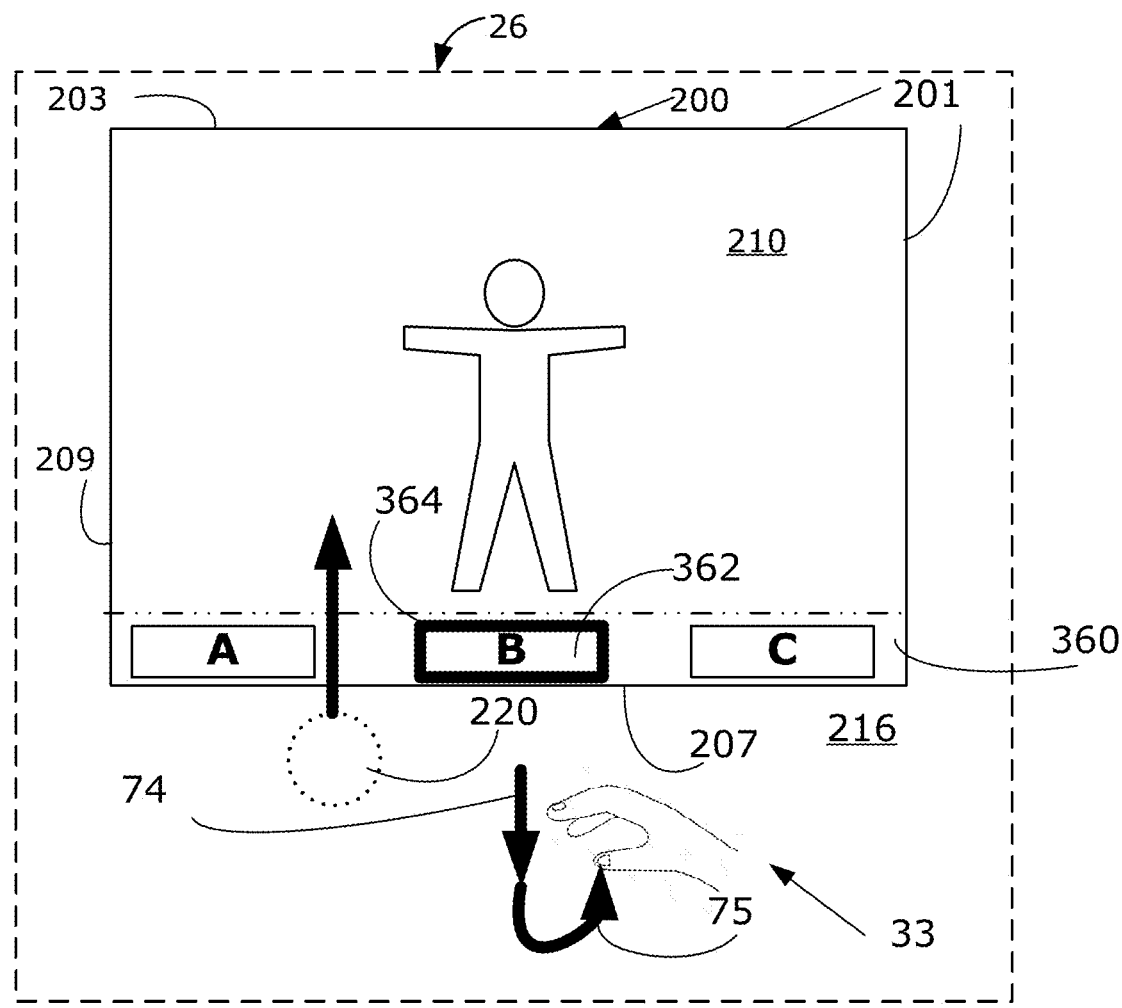
FIG. 8B depicts the display of the bottom bar.

With reference to FIG. 8B, the direction of dynamic vertical dragging gesture 33 is now switched and the hand 30 is being moved in an upward direction 75. The vertical dragging mid-air gesture 33 is recognized by the gesture-recognition system 120. The mid-air gesture 33 is provided to the mapping module 122. The mapping module 122 moves the virtual cursor 220 in the off-screen region 216 towards the bottom edge 207. As the cursor 220 crosses the lower edge 207 and back into the on-screen region 212, as shown in FIG. 8B, the edge detection module 124 triggers an action associated with the edge crossing. Namely, the edge activation module 124 indicates to the UI control module 130 to perform and action that includes displaying a bottom menu 360 of user selectable UI menu items (e.g., Box A, Box B, Box C) that each map to a respective option. Accordingly, the UI control module 130 displays a bottom menu 360 in the border region 214 along the lower edge 207.

In some embodiments, the dynamic vertical dragging gesture 33 illustrated in FIG. 8B does not cause the cursor 220 to be redisplayed in on-screen region 210, but rather causes a focus indicator 364 to highlight one of the user selectable UI menu items 362 ("Box B" UI menu item 362 in FIG. 8B).

Figure 8C:
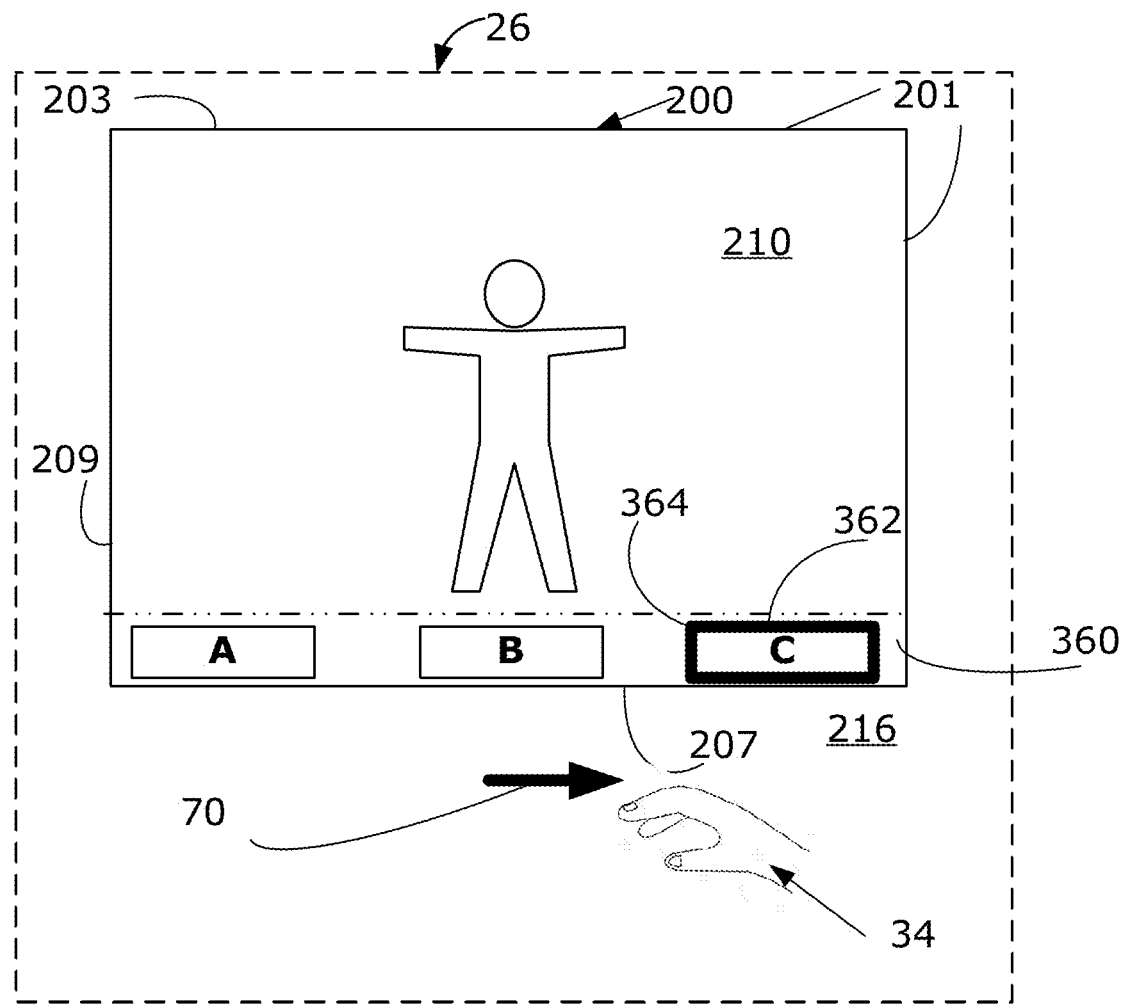
FIG. 8C depicts navigation within the bottom bar of the border region in response to a dynamic horizontal gesture.

With reference to FIG. 8C, selecting a UI menu 362 item from the bottom menu 360 can be triggered by detection of a horizontal dragging gesture. For example, as seen in FIG. 8C, the hand 30 may be moved in a horizontal dragging gesture 34 either to the right or to the left 72. The horizontal dragging gesture 34 is detected by the gesture recognition system 120 and provided to the UI control module 130. In response to the horizontal dragging gesture 34, the UI control module 130 changes the selected item from the bottom menu 360 by moving focus indicator 364 in the same direction as that of the horizontal dragging gesture 34 (In the example of FIG. 8C, UI menu item "Box C" is now selected).

Figure 8D:
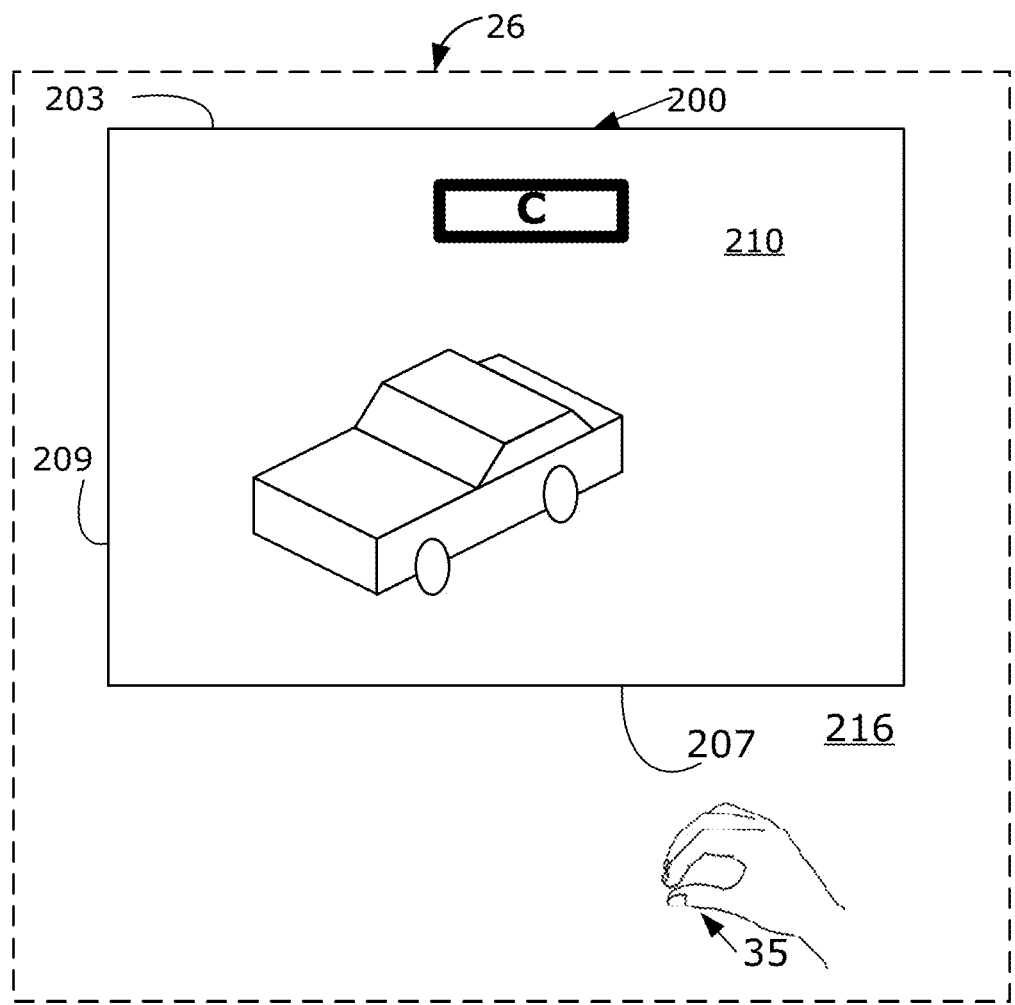
FIG. 8D depicts selection of a menu item from the bottom bar of the border region in response to a pinching gesture.

Activating the selected item from the bottom menu 360 can be done in accordance with a number of ways in different examples. In one example embodiment, the gesture recognition system 120 may detect a different gesture, such as a pinching gesture 35 while one of the items of the bottom menu 360 is selected. The gesture recognition system 120 may provide the recognized pinching gesture to the UI control module 130. In response, the UI control module 130 may activate the selected menu item thus causing the action associated therewith to be performed. As shown in FIG. 8D, the hand 30 is performing a pinching gesture 35. The gesture recognition system 120 detects the pinching gesture 35 and provides it to the UI control module 130. The UI control module 130 activates the selected UI menu item 362 causing a new movie (e.g., movie "C"), corresponding to the selected UI menu item 362, to be played.

Figure 8E:
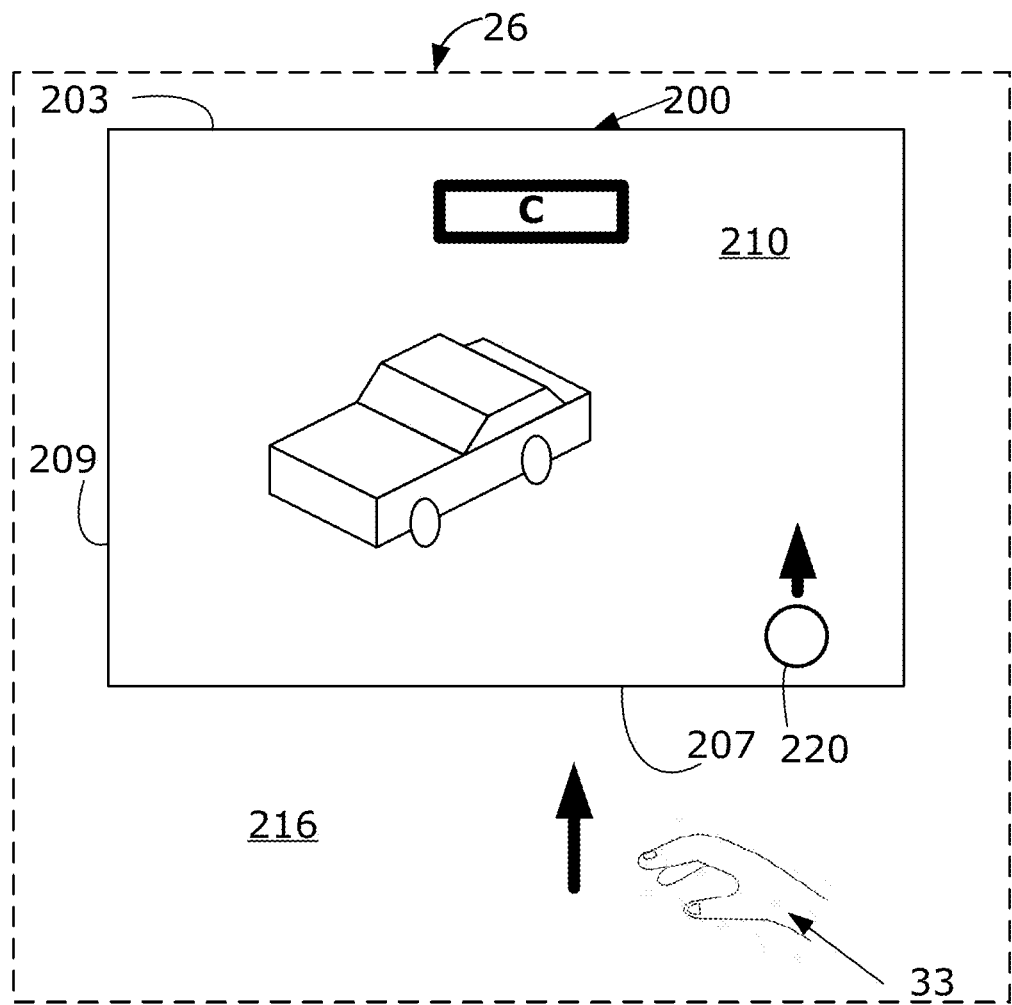
FIG. 8E depicts activation of a selected menu item from the bottom bar of the border region in response to a detected edge crossing.

In another example embodiment, after the UI menu item is selected, if the gesture recognition system 120 detects a dynamic vertical gesture 33 performed by the hand 30 towards the on-screen region 210, then the UI control module 130 activates the currently selected bottom menu item. This is depicted in FIG. 8E wherein the vertical gesture 33 has caused the currently played movie to change to the one corresponding to the selected menu item (e.g., movie "C", corresponding to the selected UI menu item 362). In a related example, the dynamic vertical gesture 33 is provided to the mapping module 122 which moves the cursor 220 back into the on-screen region 212. As the cursor 220 crosses the bottom edge 207 of the display into the on-screen region 212, the edge detection module 124 detects the crossing and indicates to the UI control module 130 that a new action is to be performed. The new action being that a new movie 237 starts playing as shown in FIG. 8E.

Figure 9A:
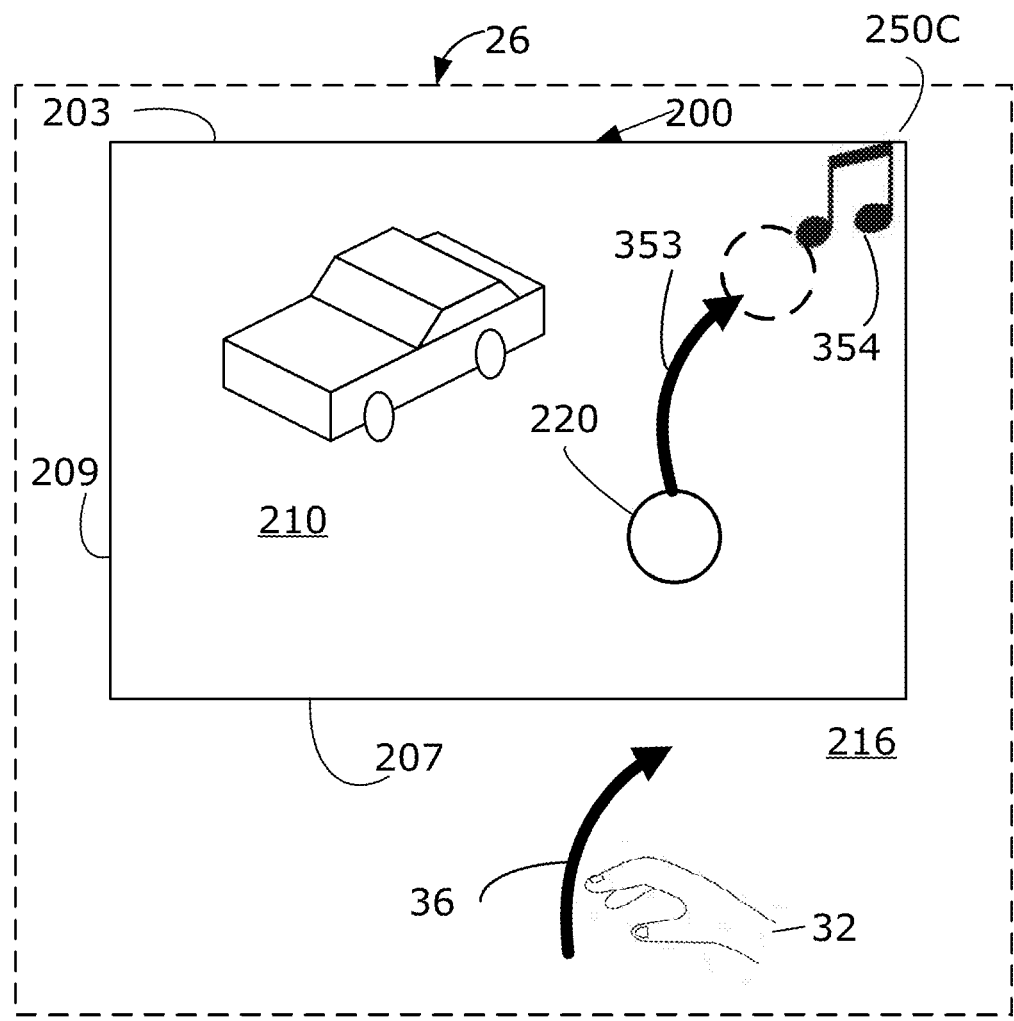
FIG. 9A depicts movement of a cursor towards a corner edge segment of a display to activate a slider control.
Figure 9B:
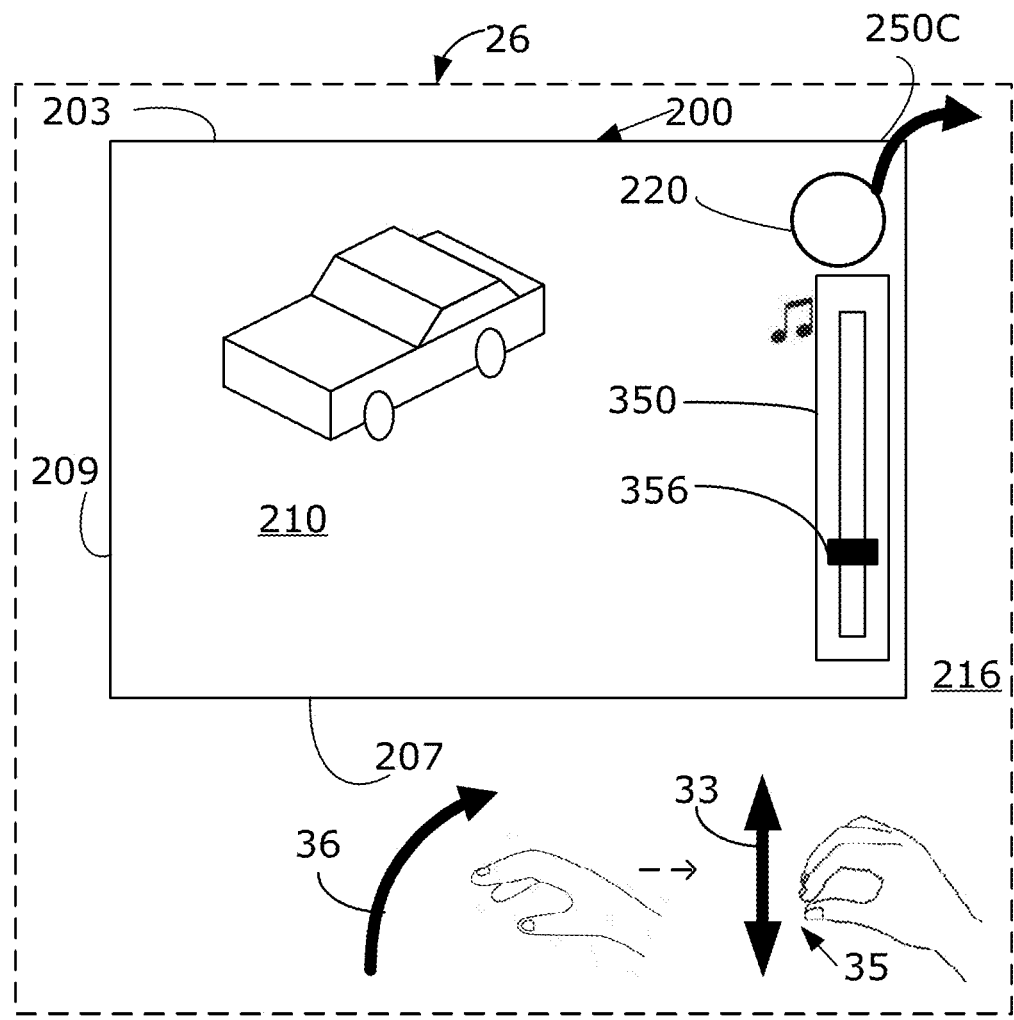
FIG. 9B depicts display of and interaction with the slider control.

With reference to FIGS. 9A and 9B, in some embodiments, an edge interaction can cause a widget such as a user interface control such as a slider control 350 to be displayed. In this regard, the edge interaction results in a display device control action that includes activating a user interface parameter control function, namely a slider control. In FIG. 9A, a media player user interface is displayed on display 200, with a cursor 220. In order to change volume of the audio track for a movie playback, user 10 forms a hand configuration in front of the display 200, such as an open pinch hand configuration 32. The user 10 then initiates an edge interaction by moving their hand in a mid-air gesture towards the top right corner of the display 200. For example, as shown in FIG. 9A, the user 10 performs a generally diagonal or curved gesture 36 towards top right corner. The gesture recognition system 120 recognizes the gesture 36 and passes it on to the mapping module 122. The mapping module 122 moves the cursor 220 towards the top right corner, as indicated by line 353. When the cursor 220 is close to the top right corner edge segment 250C (e.g., as shown in dashed lines in FIG. 9A), the UI control module 230 causes a volume icon 354 to be displayed in on-screen region 210, indicating to the user 10 that the top right corner edge segment 250C corresponds to a volume control. With reference to FIG. 9B, if the user 10 decides to adjust the volume, they can continue gesture 36 in the same direction. The UI control module 230 moves the cursor 220 towards the volume icon 354 and eventually the cursor 220 crosses the top right corner edge segment 250C or an edge approximate thereto. The edge detection module 124 detects the crossing of the cursor 220 into the off-screen region 216, and activates the action associated with that crossing. In the depicted embodiment, the edge detection module 124 directs the UI control module 230 to display the volume slider control 350. To adjust the volume, the user may virtually pinch and drag a volume control slidable element 356. For example, when a closed pinch hand configuration 35 followed by a dynamic vertical dragging gesture 33 are recognized by the gesture recognition system 120 and provided to the UI control module 230, then the UI control module 230 moves the volume slidable element 356 in the same direction as the direction of the vertical dragging gesture. In response to dragging the volume control slidable element, the volume is changed. Accordingly, a slider control 350 may be controlled by pinch and drag gestures performed while the cursor 220 is in the off-screen region 216.

Figure 10A:
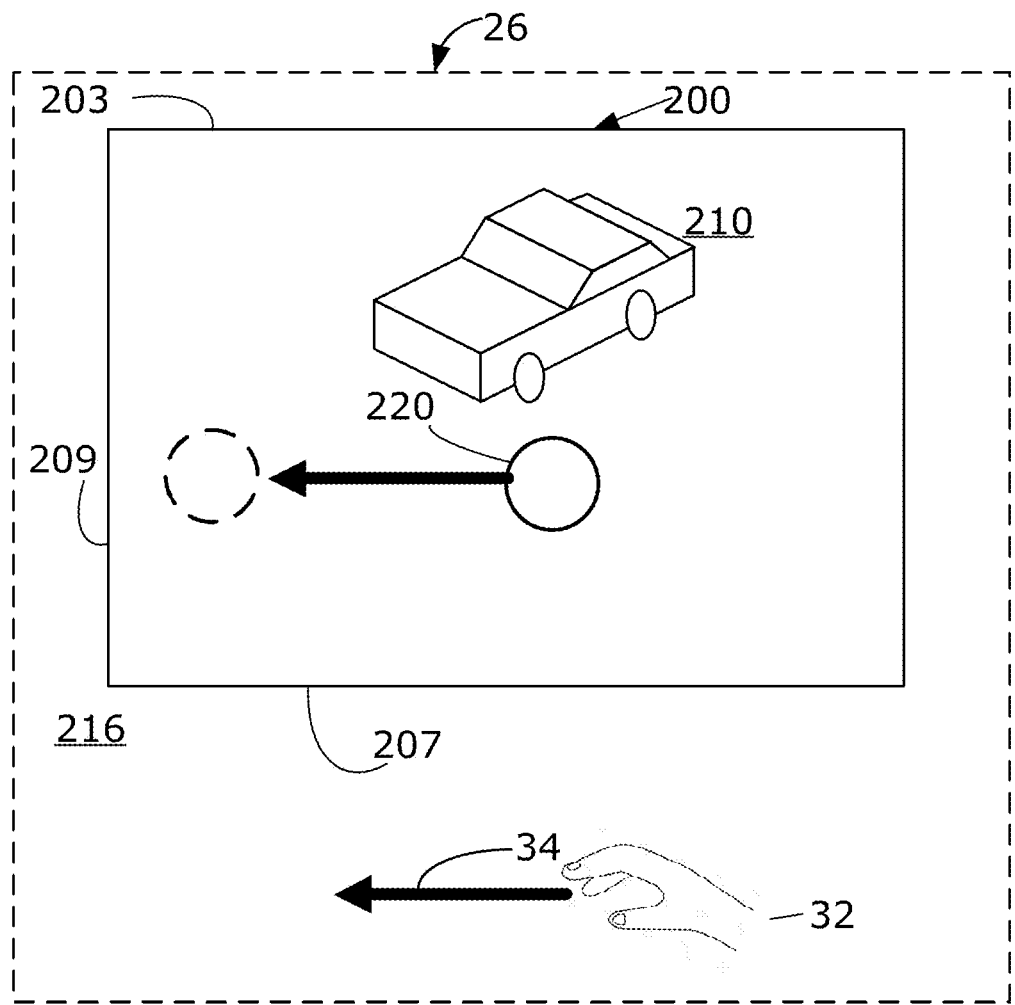
FIG. 10A depicts movement of a cursor towards a side edge segment of a display in response to a detected gesture to activate a navigation drawer.
Figure 10B:
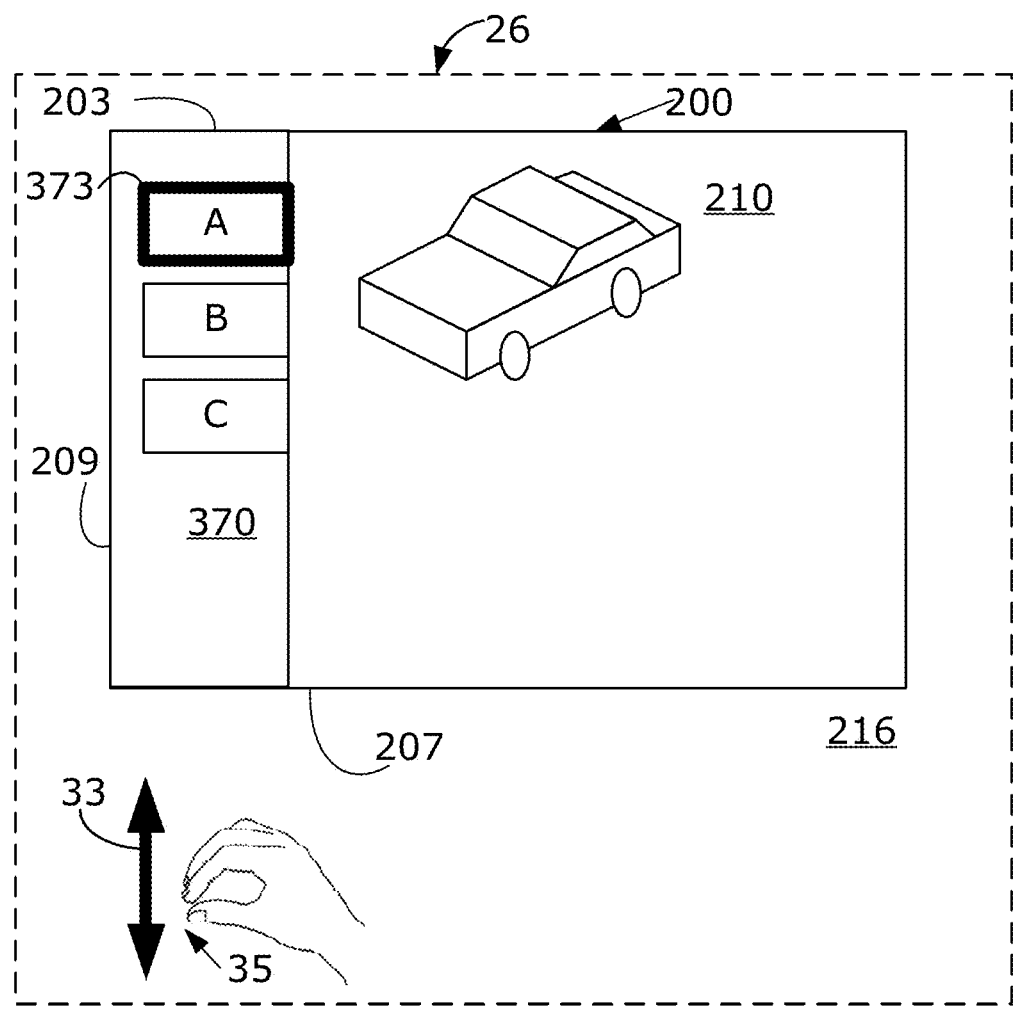
FIG. 10B depicts navigation within the navigation drawer in response to detected gestures.

Referring to FIGS. 10A and 10B, in a further example an edge interaction may trigger a UI widget such as a navigation drawer 370. For example, an edge interaction which includes moving the cursor 220 past left edge 209 of the display 200 causes a navigation drawer 370 containing a menu to be displayed, as shown in FIGS. 10A and 10B. In FIG. 10A, a dynamic horizontal dragging gesture is performed in the left direction 34. The gesture recognition system 120 recognizes the gesture, the mapping module 122 moves the cursor 220 in the same direction, as described earlier. When the cursor 220 crosses the left edge 209 into the off-screen region 216, the edge detection module 124 detects the crossing and activates an action associated with that crossing. In response, the UI control module 130 causes a navigation drawer 370 to be displayed as shown in FIG. 10B, displaying a list of user selectable navigation menu items (e.g., boxes "A", "B" and "C"). The UI control module 130 also switches the navigation focus to the navigation menu items. In FIG. 10B, menu item "A" is highlighted with a focus indicator 373 to indicate that it is the currently selected menu item default. At this point, the user 10 may select a different menu item by performing a vertical dragging gesture 33. A vertical dragging hand gesture 33 recognized by the gesture recognition system 120 is provided to the UI control module 130. The UI control module 130 changes the highlighted item in accordance with the direction of the vertical dragging gesture. For example, if the first element of the drawer is highlighted item "A"), and the recognized vertical dragging gesture was in the downward direction, then the second element (item "B"), which is below the first element, is highlighted. In response to detecting another gesture, the highlighted drawer menu item is activated. For example, as shown in FIG. 10B, in response do detecting a dynamic pinching hand gesture 35, the UI control module 130 causes the highlighted drawer item to be activated thus triggering the action associated therewith. In another embodiment (not shown), a dynamic dragging hand gesture which causes the cursor 220 to move horizontally and cross back into on-screen region 212 may be used to activate the highlighted drawer menu item 373.

Figure 11:
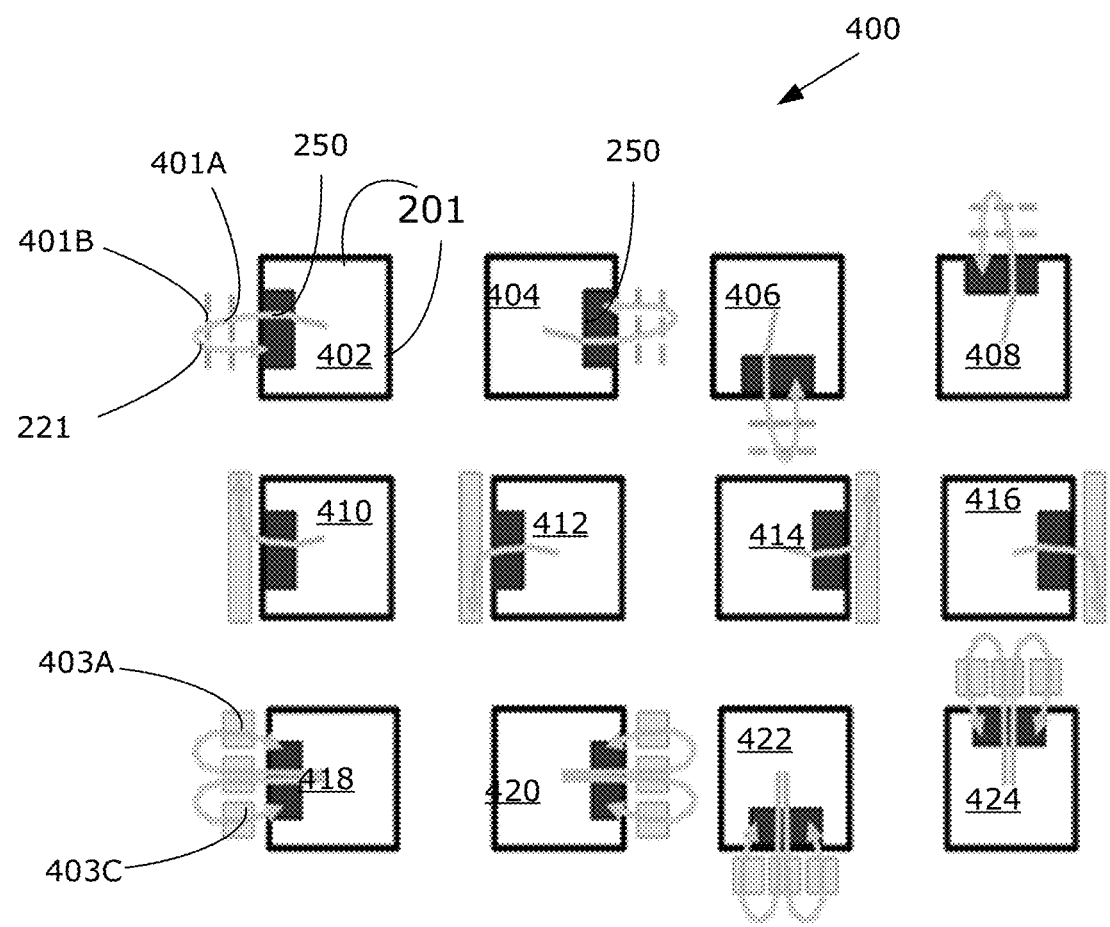
FIG. 11 is a diagram depicting a further plurality of different edge interaction examples.

FIG. 11 illustrates a number of further examples of edge interactions that are based on a combination of edge crossing interactions and detected off-screen interactions. For example, with reference to FIG. 11, a number of possible UI widget interactions are shown. In each interaction, the arrow 221 represents the path of the cursor 220 as it tracks a gesture and crosses an edge segment 250 in either a single or a double crossing. The top row of edge interactions 402, 404, 406 and 408 represent interactions with different levels of menus. For example, each of the interactions 402, 404, 406 and 408 correspond to mid-air gestures that cause the cursor 220 to cross edge of the display 200, at a border segment 250, into the off-screen region 216. The mid-air gesture continues to be tracked after the cursor 220 has gone into off-screen region 216. In this embodiment, two distance thresholds 401A and 401B are shown. For example, if the mid-air gesture changes direction and moves the off-screen cursor 220 back towards the on-screen region 210 before it reaches the first distance threshold 401A, then no navigation drawer is displayed. If the mid-air gesture changes direction and moves the cursor 220 back towards the on-screen region 212 after the cursor had passed only the first distance threshold 401A, then a navigation drawer containing a first level menu is displayed when the cursor 220 has crossed back into on-screen region 210, for example. If the mid-air gesture changes direction and moves the cursor 220 back towards the on-screen region 210 after the cursor had passed the second distance threshold 401B, then a navigation drawer containing a second level menu is displayed when the cursor 220 has crossed back into on-screen region 210, for example. Accordingly, a menu is displayed having a level which depends on a distance travelled by the cursor 220 in the off-screen region. Different menus are displayed depending on the edge segment 250 crossed. Interactions 402, 404, 406, and 408 thus display different types of menus and each with at least a first and a second level menus. Further levels may be added by adding more distance thresholds in the off-screen region 216.

The second row in FIG. 11 illustrates edge interactions 410, 412, 414, and 416 that may correspond to the interactions described above with reference to FIGS. 9A and 9B. Specifically, moving the cursor into off-screen region 216 causes the display of a slider control. Subsequently, performing a dynamic vertical mid-air gesture, while the cursor 220 is in the off-screen region 216, allows manipulation of the slider control.

The third row in FIG. 11 illustrates edge interactions 418, 420, 422 and 424 that can correspond to crossing the edge 201 to activate a drawer menu, as shown in FIGS. 9A and 9B. The off-screen gesture path followed to bring the cursor 220 back into on-screen region 210 can select and causes a menu item to be activated. The activated menu item depends on the off-screen region the cursor 220 passes through on its return path. For example, as shown with reference to the interaction 418, the cursor 220 can cross back into on-screen region 210 after crossing the off-screen region 403A. In doing so, the gesture-controlled device may select and activate a drawer menu item near the top of the drawer. Conversely, if a mid-air gesture was recognized and causes the cursor 220 to cross back into on-screen region 212 after crossing the off-screen region segment 403C, then the gesture-controlled device may select and activate a drawer menu near the bottom of the drawer.

Figure 12A:
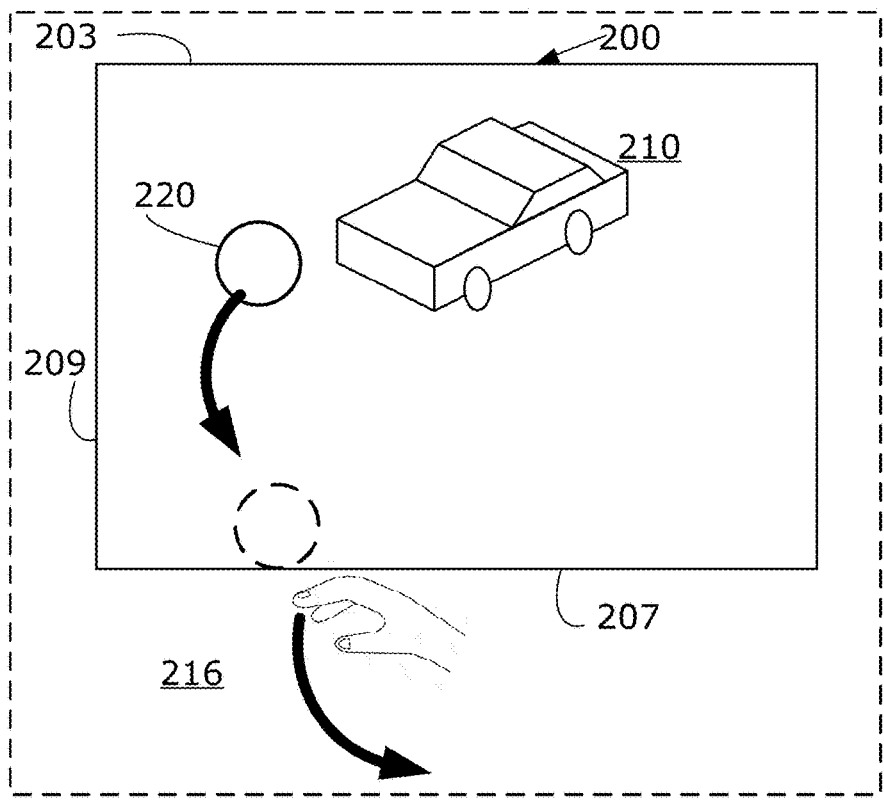
FIGS. 12A and 12B illustrate an example of edge crossing and off-screen gesture interactions.
Figure 12B:
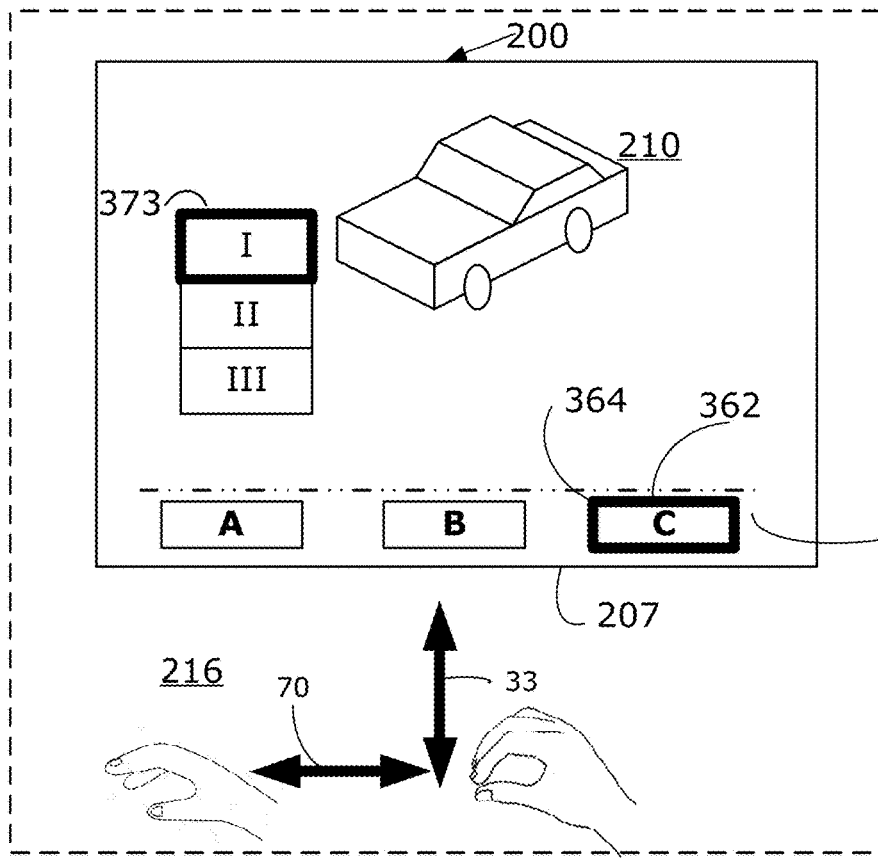

FIGS. 12A and 12B illustrate an example of a mixture of both edge crossing and off-screen interactions. As illustrated in FIG. 12A, a downward hand gesture is detected, resulting in cursor 220 crossing bottom edge 207 and into off-screen region 216, causing a bottom menu bar 360 to be displayed that includes a plurality of user selectable menu items 362 (e.g., represented by boxes A, B and C), one of which is highlighted by a focus indicator 364. Off-screen horizontal gesture movement 70 is detected to change the focus of a focus indicator 364 between menu items 362. A pinch gesture enables a user to select a focused menu item 362 (e.g., box C) resulting in a sub-menu 373 being displayed. Off-screen vertical gesture movement 33 can then be used to change focus among sub-menu 373 items (e.g., item "I", "II" and "III", with a further pinch-open gesture used to select a sub-menu item. For example, the main meu items could link to a different web service (e.g., Gmail™, Chrome™, WhatsApp™ and YouTube™), with submenu items linking to different options within each of the services (e.g., the Chrome submenu items could each link to a different bookmarked page).

Figure 13:
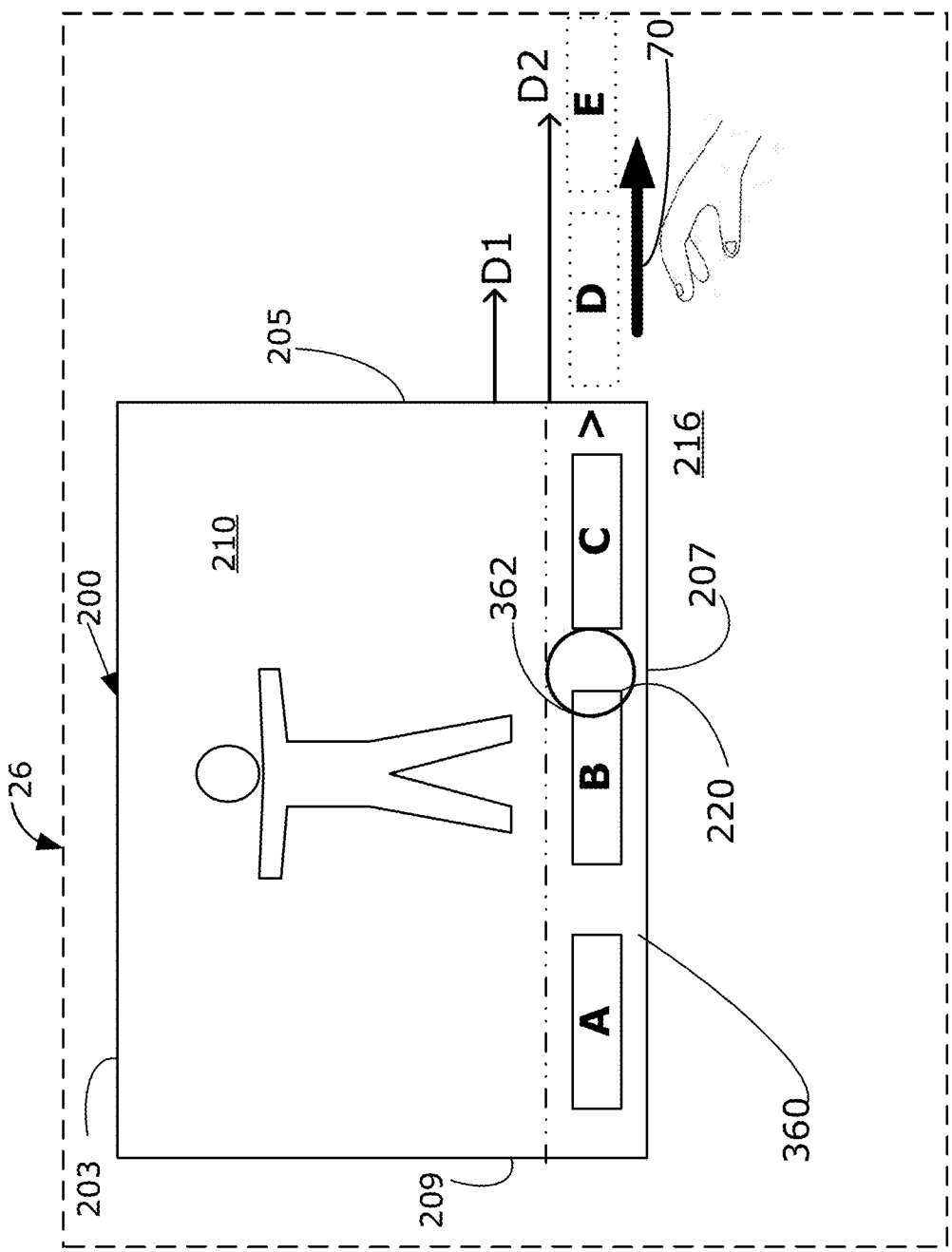
FIG. 13 illustrates a further example of edge crossing and off-screen gesture interactions.

In the example of FIG. 13, previous gestures (For examples see, FIGS. 8A and 8B), have resulted in menu bar 360, that includes horizontally arranged user selectable UI elements such as menu items 362, being displayed at the bottom border region of on-screen region 210. Although three items are displayed on-screen (e.g., items, A,B,C) the menu includes many additional items (e.g., items D, . . . , Z) that are off-screen. Gesture-controlled device 100 is configured to allow the user 10 to use hand gestures to scroll horizontally through the list of items 362 to the right or left. For example, an off-screen open hand gesture to the right direction 70 will result in cursor 220 scrolling off-screen to the right and the menu items "A", "B", "C" scrolling leftward and off-screen to the left, while menu items "D", "E" and "F" scroll on-screen from the right edge 205. Horizontal movement of hand back towards the on-screen region will cause cursor 220 to reappear on-screen and cause the menu scrolling to stop, allowing user 10- to focus and select a particular menu item. In some examples, the menu scrolling speed is determined by how far the user's hand is moved relative to the vertical display edges. For example, hand movement mapped by mapping module 122 to a first distance D1 from right side edge 205 in direction 70 will cause the menu items to scroll horizontally at a first speed, and hand movement mapped by mapping module 122 to a second, further, distance D2 from right side edge 205 in direction 70 will cause the menu items to scroll horizontally at a second, faster speed. This can provide intuitive gesture based control of the display of large menus, enabling convenient scrolling between off-screen and on-screen content. Although shown in the case of horizontal scrolling of a bottom bar, the UI items could be vertically arranged or horizontally arranged and vertically scrolled or vertically scrolled at other screen regions. In the example of FIG. 13, off-screen interactions can be used to interact with off-screen content and move off-screen content to on-screen locations.

Figure 14:
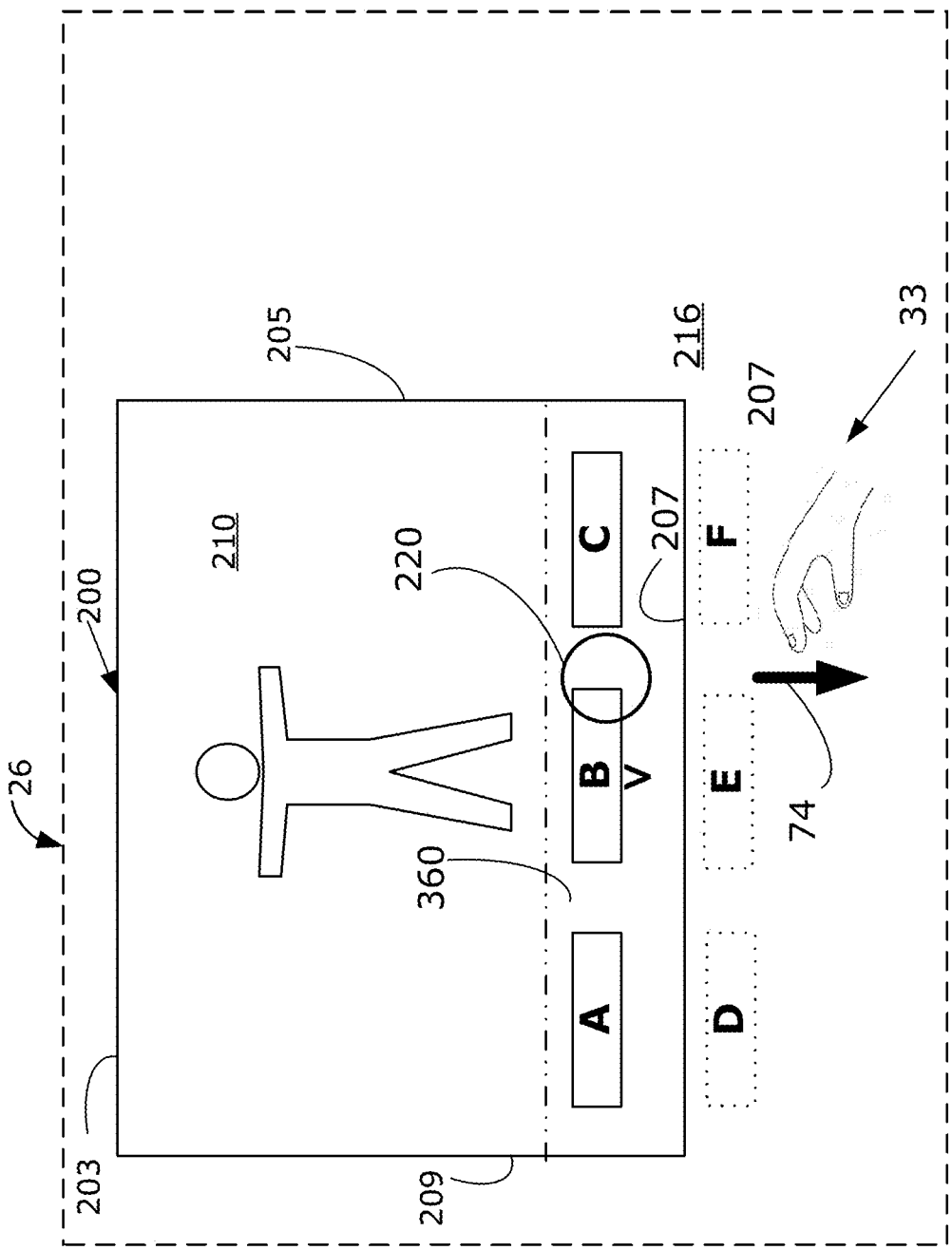
FIG. 14 illustrates a further example of edge crossing and off-screen gesture interactions.

In the example of FIG. 14, gesture-controlled device 100 is configured to recognize when an open hand drag gesture in downward direction 74 is used to drag the cursor 220 into the border region near bottom border 207 (e.g., a proximate edge interaction), and display a first row of a multi-row menu 360. If the user 10 then maintains the user hand in that position without any further gestures for a defined duration (e.g., 2 seconds), gesture-controlled device 100 interprets the user input as a "hovering" gesture and will then proceed to allow the menu rows to scroll vertically onto the on-screen region 210. In some examples, the scrolling may stop when the menu fills the entire on-screen region 210, and further scrolling can be initiated by further downward movement of the user's hand. Further hovering can be used to initiate a menu item focus indicator, with a pinch gesture being used to select a particular menu item.

Figure 15:
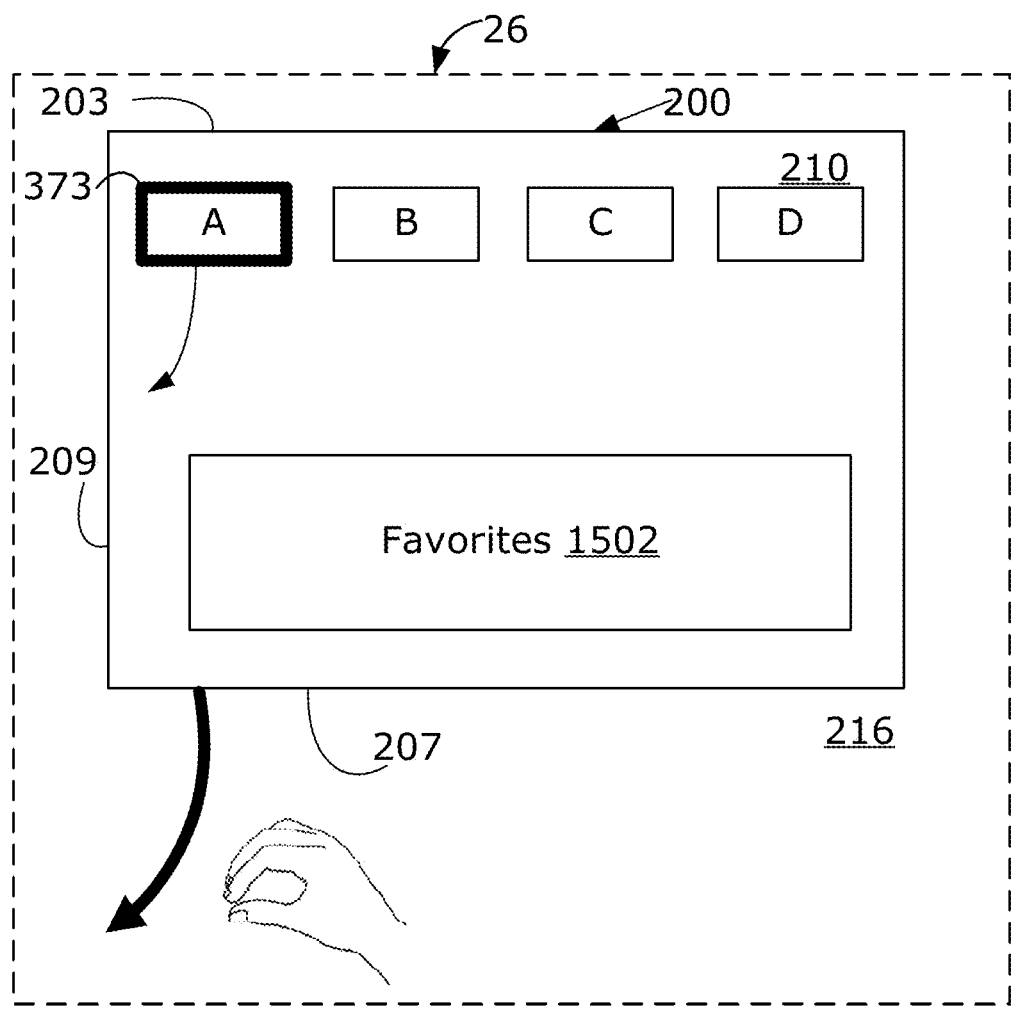
FIG. 15 illustrates a further example of edge crossing and off-screen gesture interactions.

In the example of FIG. 15, gesture-controlled device 100 is configured to enable a user to use hand gestures to maneuver a cursor 220 or other selection element (e.g., focus indicator 373) to one of a plurality of on-screen UI element (e.g., item A) and use a defined gesture (e.g., hover gesture or pinch gesture) to select the UI element. A dragging gesture can then be used to drag the UI element to the edge (e.g., left edge 209) of the screen. By way of example, the UI element can represent a content item such as an image, a paragraph, a contact, or other stored data items. The dragging to edge crossing interactions can be used to trigger an activity such a copying and pasting or saving the content item that corresponds to the selected UI element to favorites, bookmarking the content item, etc. Depending upon the edge or edge region of the crossing, and/or the off-screen distance that a gesture moves relative to the edge following an edge crossing, the user can switch between different operations. For example, a left direction gesture distance D1 from the left edge corresponds to "copy and paste to email message"; a left direction gesture distance D2 from the left edge corresponds to "copy and paste to text message attachment". A right direction gesture distance D1 from the right edge corresponds to "save to favorites"; a right direction gesture distance D2 from the right edge corresponds to "bookmark". In some examples, pinch and move gestures can be used to intuitively organize stored data elements and other user elements.

Advantageously, the edge interactions described here can support many functionalities without the need to come up with new distinct mid-air gestures. The edge interactions overcome the limitations of on-screen buttons and menus since they do not occupy and visual space on the display. Because the edge interactions are easy to perform, the user's visual attention and cognitive load are reduced. Once the edge interactions are learned by the user, eye-free interactions are possible.

In the above examples, the detection of edge interactions is facilitated by tracking movement of a navigation indicator such as a cursor in response to gestures. The navigation indicator provides both the gesture-controlled device and the user with knowledge of how gestures are mapped to locations relative to the edge 201 of the display 200. However, in alternative examples, pre-defined mid-air gestures can also be used to define virtual edges of the display 200 as a reference for mapping other gestures to on-screen and off-screen regions 210, 216.

Figure 16:
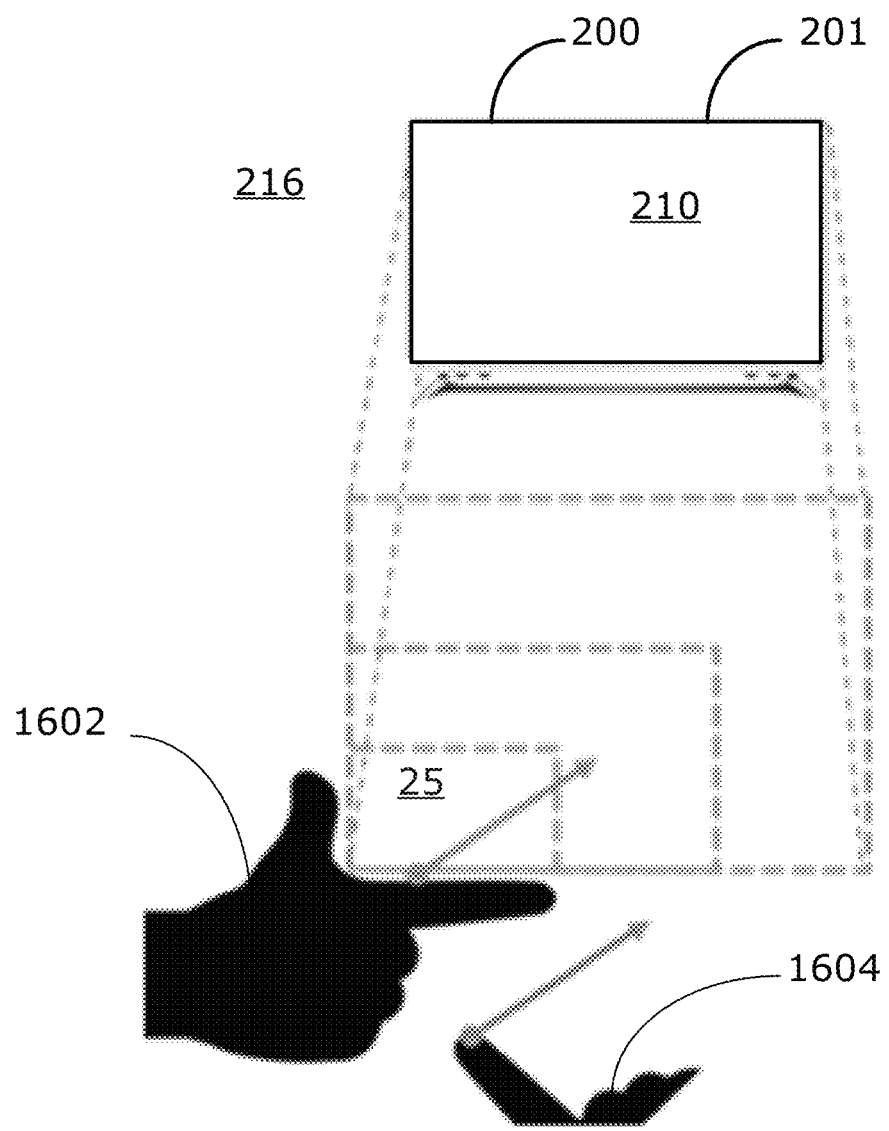
FIG. 16 illustrates a further example of edge crossing and off-screen gesture interactions.

In this regard, reference is made to FIG. 16, where gesture recognition system 120, mapping module 122 and edge detection module 124 of gesture-controlled device 100 are configured to function in a non-cursor environment. In the example of FIG. 16, gesture-controlled device 100 is configured to recognize an L-shaped gesture 1602 performed by a user's hand as providing a reference within working space 25 for the left vertical and bottom horizontal edges of display 200. Gestures by the user's other hand 1604 can then be mapped to the user interaction region corresponding to display 200 relative to the reference frame provided by L-shaped gesture 1602. These can include gestures by user's other hand 1604 that correspond to edge interactions. For example, the user does an L-shape gesture to fix the edges along the axis of the 'L' shape. The user then performs a gesture (for example any of the above described gestures) with their other hand to perform any o fteh input gestures described above. In one example, a drag or swipe of the user's other hand can be mapped to locations that correspond to a movement from the off-screen region to the on-screen region, and used to drag off-screen content to the screen.

Certain adaptations and modifications of the described embodiments can be made. The methods utilize the principle that the input space has more area or region as compared to the visual space of a display. The above discussed embodiments are considered to be illustrative and not restrictive.

The invention claimed is:

1. A method for controlling a display device, comprising:
   detecting a mid-air gesture using a sensing device;
   mapping the detected mid-air gesture to locations of an interaction region, the interaction region including an on-screen region of the display device, an off-screen region that is located outside an edge of the on-screen region and an edge region of the display device that is located at the edge of the on-screen region;
   detecting an edge interaction corresponding to a user interface control element of the display device, based on the mapping of the detected mid-air gesture to locations that interact with the edge region in a pre-defined manner; and
   performing a display device control action based on the detected edge interaction.

2. The method of claim 1 wherein the sensing device comprises an image capture device, the method comprises obtaining a plurality of video image frames using the image capture device, and detecting the mid-air gesture comprises detecting the mid-air gesture in the video image frames.

3. The method of claim 2 comprising controlling a display location of a navigation indicator by the display device based on the mapping.

4. The method of claim 3 wherein detecting the edge interaction comprises detecting an edge crossing interaction when the mapping indicates that the detected mid-air gesture corresponds to a movement of the navigation indicator at least partially across the edge from the on-screen region to the off-screen region.

5. The method of claim 4 wherein detecting the edge interaction comprises detecting an edge crossing interaction corresponding to a back function user interface control element in the off-screen region and the display device control action comprises executing a back function whereby a previously displayed user interface screen is re-displayed in the on-screen region.

6. The method of claim 4 wherein detecting the edge interaction comprises detecting an edge crossing interaction corresponding to a selectable user interface control element and the display device control action comprises evoking the selectable user interface element in the on-screen region.

7. The method of claim 6 wherein the display device control action comprises evoking a plurality of selectable user interface elements in the on-screen region, the method further comprising moving a focus indicator among the selectable user interface elements based on further mapping of one or more further detected mid-air gestures to locations in the interaction region.

8. The method of claim 6 comprising detecting a pre-defined mid-air gesture indicating selection of the selectable user interface element, and performing a second display device control action corresponding to the selectable user interface element.

9. The method of claim 8 wherein detecting the mid-air gesture in the video image frames comprises detecting a first dragging hand gesture, and mapping the detected mid-air gesture comprises mapping the first dragging hand gesture to a location within the off- screen region subsequent to detecting the edge interaction, and the pre-defined mid-air gesture is mapped to locations within the off-screen region.

10. The method of claim 9 wherein the pre-defined mid-air gesture comprises at least one of: (a) a second dragging hand gesture in a direction that is different from a direction of the first dragging hand gesture; (b) a pinching gesture; or (c) a pointing gesture.

11. The method of claim 1 comprising associating a plurality of edge segments of the edge with different corresponding control actions, wherein performing the display device control action comprises performing a control action that corresponds to the edge segment that the detected edge interaction occurs in respect of.

12. The method of claim 1 wherein detecting the edge interaction comprises detecting an edge proximity interaction when the detected mid-air gesture is mapped to one or more locations within a predefined distance of the edge.

13. The method of claim 1 wherein detecting the edge interaction comprises detecting a double edge crossing when the mapping indicates that a detected mid-air gesture is mapped to locations that pass across the edge from the on-screen region to the off-screen region and then across the edge from the off-screen region to the on-screen region.

14. The method of claim 1 wherein the sensing device is an image capture device, and detecting the mid-air gesture comprises detecting a first mid-air gesture of a first hand and detecting a second mid-air gesture of a second hand in video image frames captured by the image capture device;
   the method comprising defining an edge location of the edge based on the detected first mid-air gesture;
   wherein the mapping the detected mid-air gesture comprises mapping the second mid-air gesture to locations in the interaction region based on defined edge location.

15. A system comprising:
   a sensing device for sensing mid-air gestures;
   a display device;
   one or more processors in communication with the sensing device and the display device;
   one or more non-transitory memories storing executable instructions that when executed by the one or more processors configure the system to:

detect a mid-air gesture based on signals received from the sensing device;

map the detected mid-air gesture to locations in an interaction region that includes an on-screen region of the display device, an-off screen region that is located outside an edge of the on-screen region, and an edge region of the display device that is located at the edge of the on-screen region;

detect an edge interaction corresponding to a user interface control element of the display device when the detected mid-air gesture is mapped to locations in the interaction region that interact with the edge of the on-screen region in a predefined manner; and perform a display device control action corresponding to the detected edge interaction.

16. The system of claim 15 wherein the sensing device comprises an image capture device, and the executable instructions, when executed by the one or more processors, configure the system to obtain a plurality of video image frames using the image capture device, and detect the mid-air gesture based on the video image frames.

17. The system of claim 16 wherein the executable instructions, when executed by the one or more processors, configure the system to control a display location of a navigation indicator on by the display device based on the mapping.

18. The system of claim 15 wherein the executable instructions, when executed by the one or more processors, configure the system to detect an edge interaction when mapping indicates that one or more of the detected mid-air gestures corresponds to a series of locations that at least partially cross the edge from the on-screen region to the off-screen region.

19. The system of claim 15 wherein the executable instructions, when executed by the one or more processors, configure the system to detect an edge interaction when mapping indicates that the detected mid-air gesture corresponds to one or more locations mapped to within a predefined distance of the edge.

20. A non-transitory computer readable medium storing executable instructions that when executed by one or more processors cause the one or more processors to:

detect a mid-air gesture based on signals received from a sensing device;

map the detected mid-air gesture to locations in an interaction region that includes an on-screen region of a display device, an-off screen region that is located outside an edge of the on-screen region, and an edge region of the display device that is located at the edge of the on-screen region;

detect an edge interaction corresponding to a user interface control element of the display device when the detected mid-air gesture is mapped to locations in the interaction region that interact with the edge of the on-screen region in a predefined manner; and perform a display device control action corresponding to the detected edge interaction.

\* \* \* \* \*